US012632984B2

(12) United States Patent
Alsalka

(10) Patent No.: US 12,632,984 B2
(45) Date of Patent: May 19, 2026

(54) HAND TOUCH DETECTION USING IMAGES

(71) Applicant: Snap Inc., Santa Monica, CA (US)

(72) Inventor: Fayez Alsalka, Tampere (FI)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/791,097

(22) Filed: Jul. 31, 2024

(65) Prior Publication Data

US 2026/0038147 A1    Feb. 5, 2026

(51) Int. Cl.
| | |
|---|---|
| *G06F 3/01* | (2006.01) |
| *G06T 7/246* | (2017.01) |
| *G06T 7/73* | (2017.01) |
| *G06V 10/774* | (2022.01) |
| *G06V 20/20* | (2022.01) |
| *G06V 40/10* | (2022.01) |

(52) U.S. Cl.
CPC ............... *G06T 7/73* (2017.01); *G06F 3/011* (2013.01); *G06F 3/017* (2013.01); *G06T 7/246* (2017.01); *G06V 10/774* (2022.01); *G06V 20/20* (2022.01); *G06V 40/11* (2022.01); *G06T 2200/24* (2013.01); *G06T 2207/20081* (2013.01); *G06T 2207/20132* (2013.01); *G06T 2207/30196* (2013.01)

(58) Field of Classification Search
CPC ....... G06T 7/73; G06T 7/246; G06T 2200/24; G06T 2207/20081; G06T 2207/20132; G06T 2207/30196; G06V 20/20; G06V 40/11; G06V 10/774; G06V 40/28; G06F 3/011; G06F 3/017; G06F 3/0412; G06F 3/0482; G06F 3/03547; G06F 3/04886; G06F 3/0304; G03B 29/00
See application file for complete search history.

(56) References Cited

U.S. PATENT DOCUMENTS

| | | | |
|---|---|---|---|
| 7,971,156 | B2 | 6/2011 | Albertson et al. |
| 9,225,897 | B1 | 12/2015 | Sehn et al. |
| 9,276,886 | B1 | 3/2016 | Samaranayake |
| 9,705,831 | B2 | 7/2017 | Spiegel |

(Continued)

FOREIGN PATENT DOCUMENTS

| | | |
|---|---|---|
| EP | 3707693 A1 | 9/2020 |
| EP | 4172726 A1 | 5/2023 |

(Continued)

OTHER PUBLICATIONS

"International Application Serial No. PCT US2025 039923, International Search Report mailed Nov. 12, 2025", 4 pgs.

(Continued)

*Primary Examiner* — Richard J Hong
(74) *Attorney, Agent, or Firm* — Schwegman Lundberg & Woessner, P.A.

(57) ABSTRACT

An XR system is provided. This system captures images including images of a first hand of a user and a second hand of the user using one or more cameras. The XR system generates cropped images using the images, each cropped image including a surface of the first hand. The XR system detects a hand touch of the surface of the hand by a digit of the second hand using the cropped images. The hand touch is used as an input into an XR user interface of the XR system. The surface of the hand can be palmar surface or a hand dorsal surface.

20 Claims, 19 Drawing Sheets

(56) References Cited

U.S. PATENT DOCUMENTS

| | | | |
|---|---|---|---|
| 9,742,713 B2 | 8/2017 | Spiegel et al. | |
| 10,102,423 B2 | 10/2018 | Shaburov et al. | |
| 10,284,508 B1 | 5/2019 | Allen et al. | |
| 10,439,972 B1 | 10/2019 | Spiegel et al. | |
| 10,509,466 B1 | 12/2019 | Miller et al. | |
| 10,514,876 B2 | 12/2019 | Sehn | |
| 10,579,869 B1 | 3/2020 | Xiong et al. | |
| 10,591,730 B2 | 3/2020 | Rodriguez, II et al. | |
| 10,614,855 B2 | 4/2020 | Huang | |
| 10,748,347 B1 | 8/2020 | Li et al. | |
| 10,754,418 B1 | 8/2020 | Ruppert et al. | |
| 10,958,608 B1 | 3/2021 | Allen et al. | |
| 10,962,809 B1 | 3/2021 | Castañeda | |
| 10,996,846 B2 | 5/2021 | Robertson et al. | |
| 10,997,787 B2 | 5/2021 | Ge et al. | |
| 11,012,390 B1 | 5/2021 | Al Majid et al. | |
| 11,030,454 B1 | 6/2021 | Xiong et al. | |
| 11,036,368 B1 | 6/2021 | Al Majid et al. | |
| 11,062,498 B1 | 7/2021 | Voss et al. | |
| 11,087,728 B1 | 8/2021 | Canberk et al. | |
| 11,092,998 B1 | 8/2021 | Castañeda et al. | |
| 11,106,342 B1 | 8/2021 | Al Majid et al. | |
| 11,126,206 B2 | 9/2021 | Meisenholder et al. | |
| 11,143,867 B2 | 10/2021 | Rodriguez, II | |
| 11,169,600 B1 | 11/2021 | Canberk et al. | |
| 11,227,626 B1 | 1/2022 | Krishnan Gorumkonda et al. | |
| 11,307,747 B2 | 4/2022 | Dancie et al. | |
| 11,531,402 B1 | 12/2022 | Stolzenberg | |
| 11,546,505 B2 | 1/2023 | Canberk | |
| 11,798,201 B2 | 10/2023 | Eirinberg et al. | |
| 2010/0066675 A1* | 3/2010 | Wilson | G03B 29/00 |
| | | | 345/157 |
| 2011/0115746 A1* | 5/2011 | Wang | G06F 3/0412 |
| | | | 345/175 |
| 2014/0055343 A1* | 2/2014 | Kim | G06F 3/0304 |
| | | | 345/156 |
| 2016/0019762 A1* | 1/2016 | Levesque | G06F 3/03547 |
| | | | 340/407.1 |
| 2017/0140547 A1 | 5/2017 | Tsurumi | |
| 2017/0186286 A1* | 6/2017 | Levesque | G06F 3/011 |
| 2017/0278304 A1* | 9/2017 | Hildreth | G06F 3/017 |
| 2019/0146219 A1 | 5/2019 | Rodriguez, II | |
| 2019/0172326 A1* | 6/2019 | Levesque | G06F 3/04886 |
| 2021/0011612 A1 | 1/2021 | Dancie et al. | |
| 2021/0074016 A1 | 3/2021 | Li et al. | |
| 2021/0166732 A1 | 6/2021 | Shaburova et al. | |
| 2021/0174034 A1 | 6/2021 | Retek et al. | |
| 2021/0241529 A1 | 8/2021 | Cowburn et al. | |
| 2021/0303075 A1 | 9/2021 | Cowburn et al. | |
| 2021/0303077 A1 | 9/2021 | Anvaripour et al. | |
| 2021/0303140 A1 | 9/2021 | Mourkogiannis | |
| 2021/0382564 A1 | 12/2021 | Blachly et al. | |
| 2021/0397000 A1 | 12/2021 | Rodriguez, II | |
| 2021/0405761 A1 | 12/2021 | Canberk | |
| 2022/0188539 A1 | 6/2022 | Chan et al. | |
| 2022/0206588 A1 | 6/2022 | Canberk et al. | |
| 2022/0300730 A1 | 9/2022 | Eirinberg et al. | |
| 2022/0300731 A1 | 9/2022 | Eirinberg et al. | |
| 2022/0301231 A1 | 9/2022 | Eirinberg et al. | |
| 2022/0326781 A1 | 10/2022 | Hwang et al. | |
| 2022/0334649 A1 | 10/2022 | Hwang et al. | |
| 2022/0375174 A1 | 11/2022 | Arya et al. | |
| 2024/0094824 A1* | 3/2024 | Krishnan Gorumkonda | |
| | | | G06V 40/28 |
| 2024/0303843 A1* | 9/2024 | Guler | G06V 20/20 |
| 2025/0037405 A1* | 1/2025 | Lee | G06F 3/0482 |

FOREIGN PATENT DOCUMENTS

| | | | |
|---|---|---|---|
| EP | 4172730 A1 | 5/2023 | |
| KR | 20220158824 A | 12/2022 | |
| WO | 2019094618 A1 | 5/2019 | |
| WO | WO-2020036604 A1 * | 2/2020 | |
| WO | 2022005687 A1 | 1/2022 | |
| WO | 2022005693 A1 | 1/2022 | |
| WO | 2022060549 A3 | 3/2022 | |
| WO | 2022066578 A1 | 3/2022 | |
| WO | 2022060549 A2 | 4/2022 | |
| WO | 2022132381 A1 | 6/2022 | |
| WO | 2022146678 A1 | 7/2022 | |
| WO | 2022198182 A1 | 9/2022 | |
| WO | 2022216784 A1 | 10/2022 | |
| WO | 2022225761 A1 | 10/2022 | |
| WO | 2022245765 A1 | 11/2022 | |

OTHER PUBLICATIONS

"International Application Serial No. PCT US2025 039923, Written Opinion mailed Nov. 12, 2025", 6 pgs.

Ono, Ryosuke, "Palm+Act Operation by Visually Captured 3D Force on Palm", Nov. 19, 2013, 3 pgs.

Sekiya, Yuto, "Detection of Finger Contact with Skin Based on Shadows and Texture Arounf Fingertips", pp. 109-122, Jul. 3, 2021, 14 pgs.

\* cited by examiner

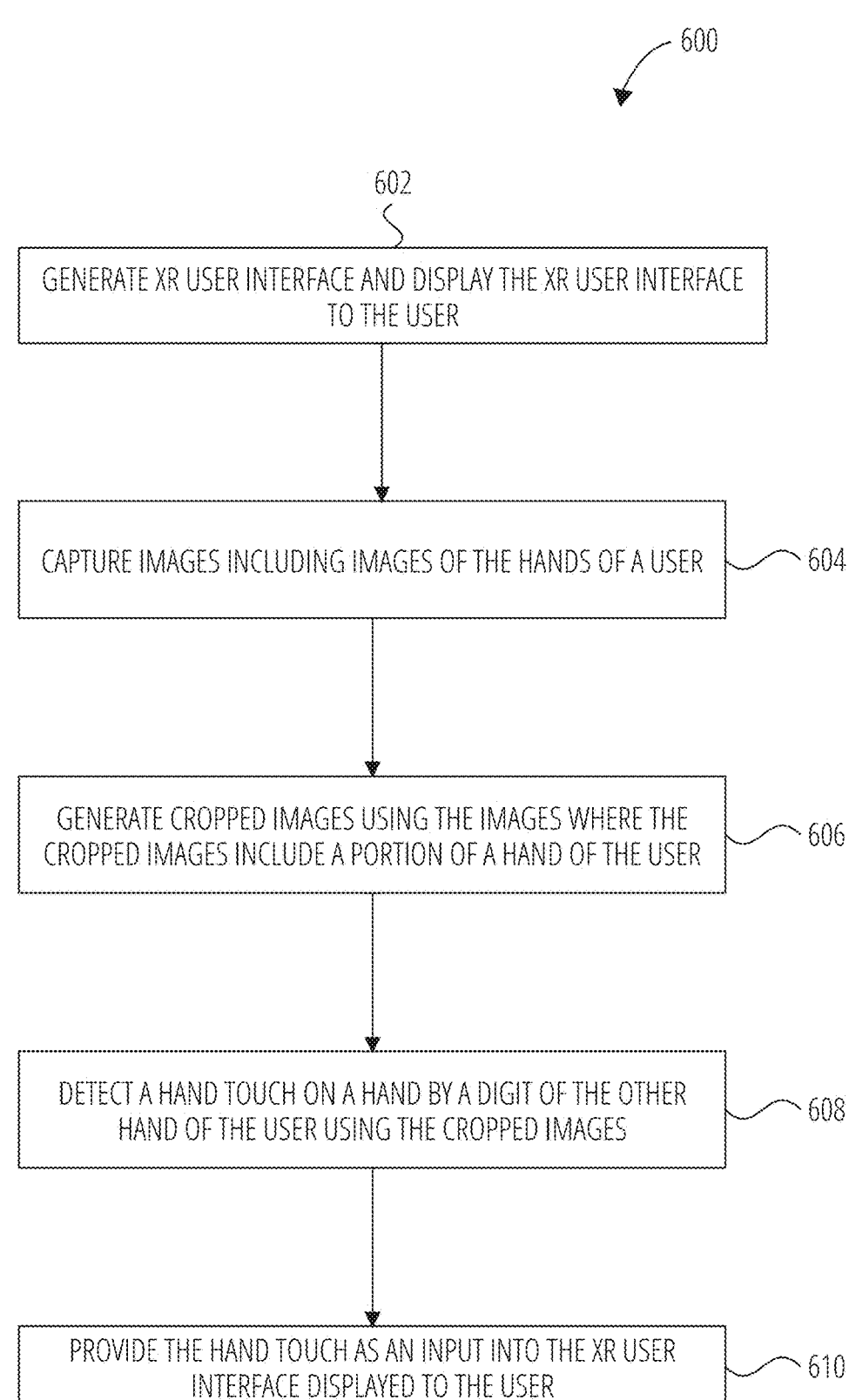

600

602

GENERATE XR USER INTERFACE AND DISPLAY THE XR USER INTERFACE TO THE USER

CAPTURE IMAGES INCLUDING IMAGES OF THE HANDS OF A USER — 604

GENERATE CROPPED IMAGES USING THE IMAGES WHERE THE CROPPED IMAGES INCLUDE A PORTION OF A HAND OF THE USER — 606

DETECT A HAND TOUCH ON A HAND BY A DIGIT OF THE OTHER HAND OF THE USER USING THE CROPPED IMAGES — 608

PROVIDE THE HAND TOUCH AS AN INPUT INTO THE XR USER INTERFACE DISPLAYED TO THE USER — 610

802 DATA COLLECTION AND PREPROCESSING

804 FEATURE ENGINEERING

806 MODEL SELECTION AND TRAINING

808 MODEL EVALUATION

810 PREDICTION

812 VALIDATION, REFINEMENT OR RETRAINING

814 DEPLOYMENT

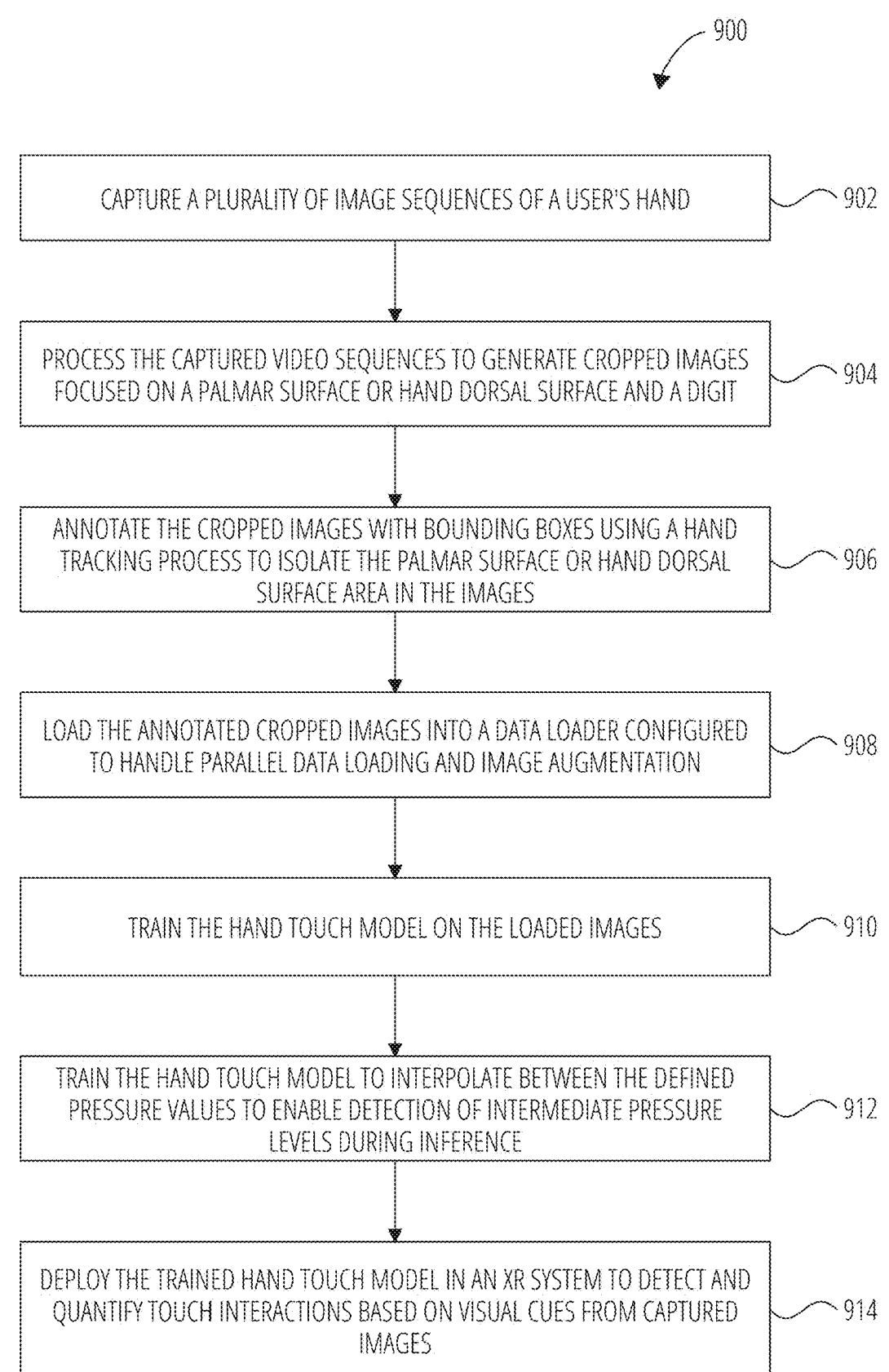

900

CAPTURE A PLURALITY OF IMAGE SEQUENCES OF A USER'S HAND ⟶ 902

PROCESS THE CAPTURED VIDEO SEQUENCES TO GENERATE CROPPED IMAGES FOCUSED ON A PALMAR SURFACE OR HAND DORSAL SURFACE AND A DIGIT ⟶ 904

ANNOTATE THE CROPPED IMAGES WITH BOUNDING BOXES USING A HAND TRACKING PROCESS TO ISOLATE THE PALMAR SURFACE OR HAND DORSAL SURFACE AREA IN THE IMAGES ⟶ 906

LOAD THE ANNOTATED CROPPED IMAGES INTO A DATA LOADER CONFIGURED TO HANDLE PARALLEL DATA LOADING AND IMAGE AUGMENTATION ⟶ 908

TRAIN THE HAND TOUCH MODEL ON THE LOADED IMAGES ⟶ 910

TRAIN THE HAND TOUCH MODEL TO INTERPOLATE BETWEEN THE DEFINED PRESSURE VALUES TO ENABLE DETECTION OF INTERMEDIATE PRESSURE LEVELS DURING INFERENCE ⟶ 912

DEPLOY THE TRAINED HAND TOUCH MODEL IN AN XR SYSTEM TO DETECT AND QUANTIFY TOUCH INTERACTIONS BASED ON VISUAL CUES FROM CAPTURED IMAGES ⟶ 914

HAND TOUCH DETECTION USING IMAGES

TECHNICAL FIELD

The present disclosure relates generally to user interfaces and, more particularly, to user interfaces used for extended reality.

BACKGROUND

A head-wearable apparatus can be implemented with a transparent or semi-transparent display through which a user of the head-wearable apparatus can view the surrounding environment. Such head-wearable apparatuses enable a user to see through the transparent or semi-transparent display to view the surrounding environment, and to also see objects (e.g., objects such as a rendering of a 2D or 3D graphic model, images, video, text, and so forth) that are generated for display to appear as a part of, and/or overlaid upon, the surrounding environment. This is typically referred to as "augmented reality" or "AR." A head-wearable apparatus can additionally completely occlude a user's visual field and display a virtual environment through which a user can move or be moved. This is typically referred to as "virtual reality" or "VR." In a hybrid form, a view of the surrounding environment is captured using cameras, and then that view is displayed along with augmentation to the user on displays the occlude the user's eyes. As used herein, the term extended Reality (XR) refers to augmented reality, virtual reality and any of hybrids of these technologies unless the context indicates otherwise.

A user of the head-wearable apparatus can access and use a computer software application to perform various tasks or engage in an activity. To use the computer software application, the user interacts with a user interface provided by the head-wearable apparatus.

BRIEF DESCRIPTION OF THE SEVERAL VIEWS OF THE DRAWINGS

In the drawings, which are not necessarily drawn to scale, like numerals can describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 6A illustrates a hand touch input method, according to some examples.

FIG. 9 illustrates a hand touch model training method 900, according to some examples.

FIG. 12 is a block diagram showing a software architecture, according to some examples.

DETAILED DESCRIPTION

Figure 1A:
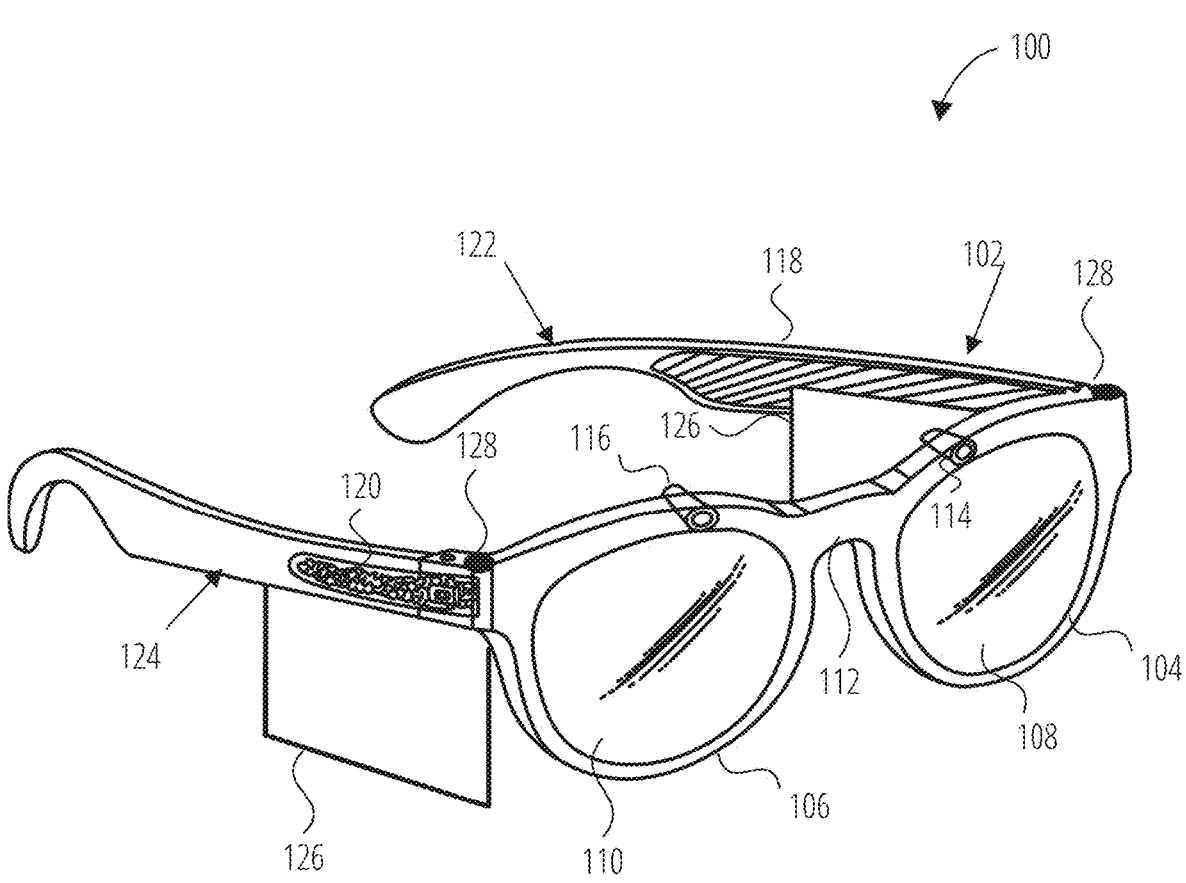
FIG. 1A is a perspective view of a head-wearable apparatus, according to some examples.

Extended Reality (XR) systems have transformed how users interact with digital content. However, these systems often face challenges in accurately interpreting user gestures, especially in environments where precise and intuitive user inputs are beneficial. Traditional XR interfaces typically depend on physical controllers or less precise gesture recognition technologies, which can affect the user experience and restrict the system's use in professional and creative settings. Additionally, the difficulty of these systems in detecting nuanced user interactions can impact their functionality and user engagement.

The methodologies described in the present disclosure address these challenges by using a hand touch detection process capable of detecting and interpreting detailed hand touch interactions directly from images captured of a user's hands. In addition, the methodologies integrate haptic feedback without the use of separate haptic component. This not only allows for more immersive and engaging user experiences but also provides tactile responses that mimic real-world interactions with control surfaces of a user interface. By detecting the pressure and location of a touch on the palm, a system can deliver precise haptic feedback for user interactions with interactive virtual objects. This feature enriches the user's sensory experience, making virtual environments feel more realistic and connected, thereby bridging the gap between digital content and physical sensation. In addition, the methodologies reduce the reliance on physical controllers and enhances gesture recognition accuracy. By training a machine learning model to recognize subtle variations in touch pressure and gesture dynamics, a system using these methodologies can provide a more natural and responsive user interface. These methodologies not only enhances user satisfaction and system usability but also broadens the potential applications of XR systems in areas such as medical simulation, professional training, and interactive design, where precision and reliability of user inputs are beneficial.

In some examples, an XR system captures images including images of a first hand of a user and a second hand of the user using one or more cameras. The XR system generates cropped images using the images, each cropped image including a palmar surface or hand dorsal surface of the first hand. The XR system detects a hand touch of the palmar surface or hand dorsal surface by a digit of the second hand using the cropped images. The hand touch is used as an input into an XR user interface of the XR system.

In some examples, the XR system generates the cropped images by applying a hand-tracking process to isolate an area of a palmar surface or hand dorsal surface of the first hand in the images.

In some examples, the XR system detects the hand touch by interpolating between two or more detected hand touch pressure levels.

In some examples, the XR system calibrates a hand touch detection sensitivity using a set of individual hand characteristics of the user.

In some examples, the XR system generates the cropped images by applying a hand tracking process to isolate an area of a palmar surface or hand dorsal surface of the first hand in the images.

In some examples, the XR system detects the hand touch by using a machine learning model trained on a dataset including images of hand touches under two or more lighting conditions.

In some examples, the XR system is identified as a head-wearable apparatus.

In some examples, the XR system captures images of the body of a user and detects touches by the user on those portions of the body of the user.

Other technical features can be readily apparent to one skilled in the art from the following figures, descriptions, and claims.

FIG. 1A is a perspective view of a head-wearable apparatus 100 according to some examples. The head-wearable apparatus 100 can be a client device of an XR system, such as a user system 202 of FIG. 2. The head-wearable apparatus 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the head-wearable apparatus 100.

The frame 102 additionally includes a left arm or left temple piece 122 and a right arm or right temple piece 124.

In some examples the frame 102 can be formed from a single piece of material so as to have a unitary or integral construction.

The head-wearable apparatus 100 can include a computing device, such as a computer 120, which can be of any suitable type so as to be carried by the frame 102 and, in one or more examples, of a suitable size and shape, so as to be partially disposed in one of the left temple piece 122 or the right temple piece 124. The computer 120 can include one or more processors with memory, wireless communication circuitry, and a power source. As discussed below, the computer 120 comprises low-power circuitry 324, high-speed circuitry 326, and a display processor. Various other examples can include these elements in different configurations or integrated together in different ways. Additional details of aspects of the computer 120 can be implemented as illustrated by the machine 400 discussed herein.

The computer 120 additionally includes a battery 118 or other suitable portable power supply. In some examples, the battery 118 is disposed in left temple piece 122 and is electrically coupled to the computer 120 disposed in the right temple piece 124. The head-wearable apparatus 100 can include a connector or port (not shown) suitable for charging the battery 118, a wireless receiver, transmitter or transceiver (not shown), or a combination of such devices.

The head-wearable apparatus 100 includes a first or left camera 114 and a second or right camera 116. Although two cameras are depicted, other examples contemplate the use of a single or additional (i.e., more than two) cameras.

In some examples, the head-wearable apparatus 100 includes any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide tracking image data for use by the head-wearable apparatus 100 to extract 3D information from a real-world scene.

The head-wearable apparatus 100 can also include a touchpad 126 mounted to or integrated with one or both of the left temple piece 122 and right temple piece 124. The touchpad 126 is generally vertically-arranged, approximately parallel to a user's temple in some examples. As used herein, generally vertically aligned means that the touchpad is more vertical than horizontal, although potentially more vertical than that. Additional user input can be provided by one or more buttons 128, which in the illustrated examples are provided on the outer upper edges of the left optical element holder 104 and right optical element holder 106. The one or more touchpads 126 and buttons 128 provide a means whereby the head-wearable apparatus 100 can receive input from a user of the head-wearable apparatus 100.

Figure 1B:
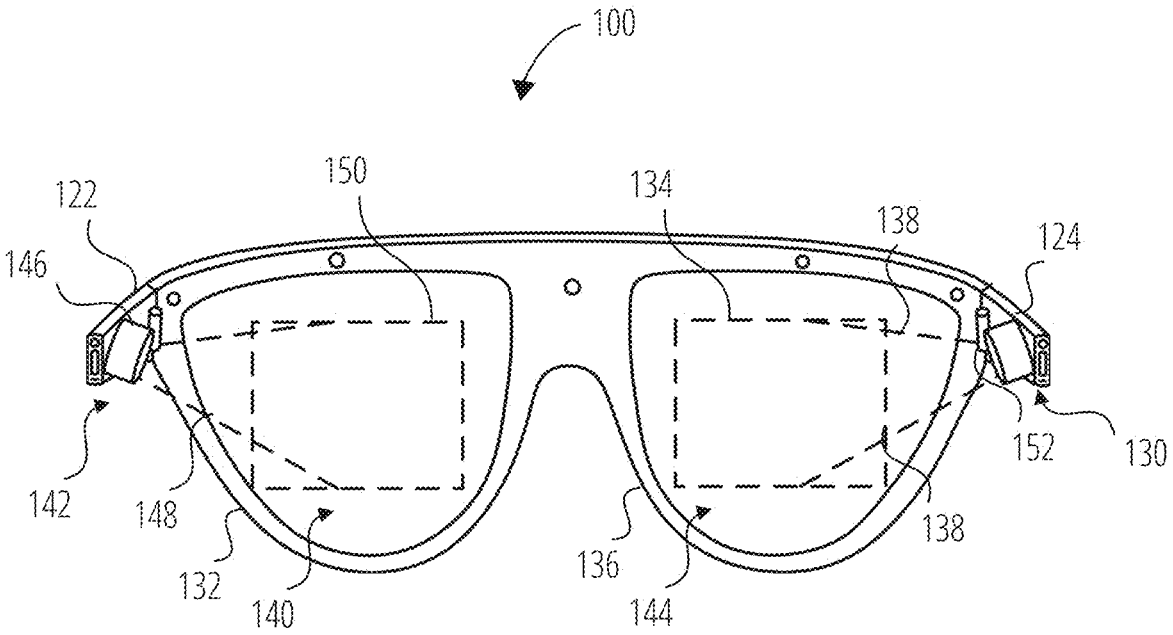
FIG. 1B illustrates a further view of the head-wearable apparatus of FIG. 1A, according to some examples.

FIG. 1B illustrates the head-wearable apparatus 100 from the perspective of a user while wearing the head-wearable apparatus 100. For clarity, a number of the elements shown in FIG. 1A have been omitted. As described in FIG. 1A, the head-wearable apparatus 100 shown in FIG. 1B includes left optical element 140 and right optical element 144 secured within the left optical element holder 132 and the right optical element holder 136 respectively.

The head-wearable apparatus 100 includes right forward optical assembly 130 comprising a left near eye display 150, a right near eye display 134, and a left forward optical assembly 142 including a left projector 146 and a right projector 152.

In some examples, the near eye displays are waveguides. The waveguides include reflective or diffractive structures (e.g., gratings and/or optical elements such as mirrors, lenses, or prisms). Light 138 emitted by the right projector 152 encounters the diffractive structures of the waveguide of the right near eye display 134, which directs the light towards the right eye of a user to provide an image on or in the right optical element 144 that overlays the view of the real-world scene seen by the user. Similarly, light 148 emitted by the left projector 146 encounters the diffractive structures of the waveguide of the left near eye display 150, which directs the light towards the left eye of a user to provide an image on or in the left optical element 140 that overlays the view of the real-world scene seen by the user. The combination of a Graphical Processing Unit, an image display driver, the right forward optical assembly 130, the left forward optical assembly 142, left optical element 140, and the right optical element 144 provide an optical engine of the head-wearable apparatus 100. The head-wearable apparatus 100 uses the optical engine to generate an overlay of the real-world scene view of the user including display of a user interface to the user of the head-wearable apparatus 100.

It will be appreciated however that other display technologies or configurations can be utilized within an optical engine to display an image to a user in the user's field of view. For example, instead of a projector and a waveguide, an LCD, LED or other display panel or surface can be provided.

In use, a user of the head-wearable apparatus 100 will be presented with information, content and various user interfaces on the near eye displays. As described in more detail herein, the user can then interact with the head-wearable apparatus 100 using a touchpad 126 and/or the button 128, voice inputs or touch inputs on an associated device (e.g. mobile device 214 illustrated in FIG. 3), touches on portions of the body of the user, and/or hand movements, locations, and positions recognized by the head-wearable apparatus 100.

In some examples, an optical engine of an XR system is incorporated into a lens that is in contact with a user's eye, such as a contact lens or the like. The XR system generates images of an XR experience using the contact lens.

In some examples, the head-wearable apparatus 100 comprises an XR system. In some examples, the head-wearable apparatus 100 is a component of an XR system including additional computational components. In some examples, the head-wearable apparatus 100 is a component in an XR system comprising additional user input systems or devices.

Figure 2:
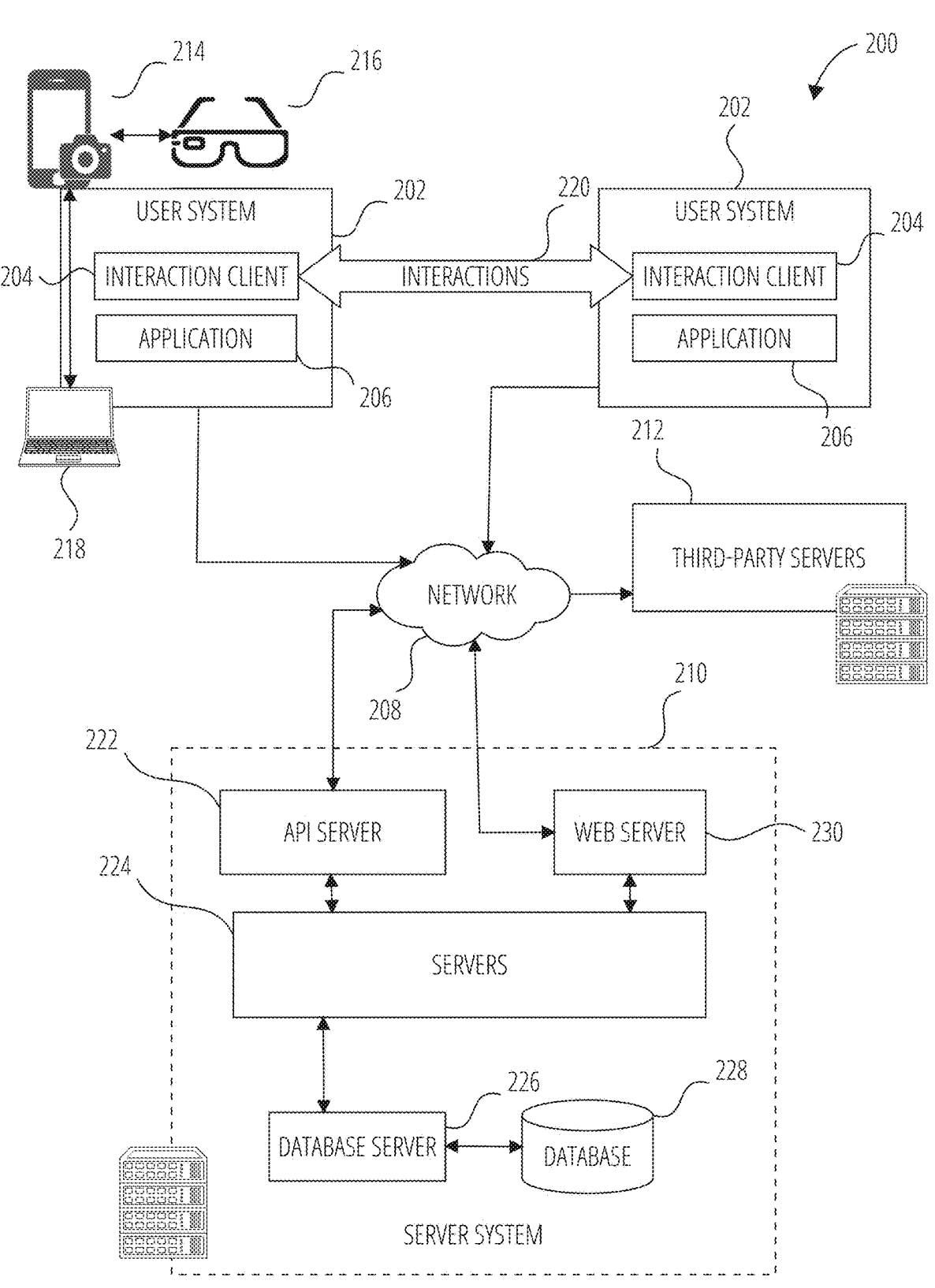
FIG. 2 is a diagrammatic representation of a networked environment in which the present disclosure can be deployed, according to some examples.

FIG. 2 is a block diagram showing an example digital interaction system 200 for facilitating interactions and engagements (e.g., exchanging text messages, conducting text audio and video calls, or playing games) over a network. The digital interaction system 200 includes multiple user systems 202, each of which hosts multiple applications, including an interaction client 204 and other applications 206. Each interaction client 204 is communicatively coupled, via one or more networks including a network 208 (e.g., the Internet), to other instances of the interaction client 204 (e.g., hosted on respective other user systems), a server system 210 and third-party servers 212). An interaction client 204 can also communicate with locally hosted applications 206 using Applications Program Interfaces (APIs).

Each user system 202 can include multiple user devices, such as a mobile device 214, head-wearable apparatus 216, and a computer client device 218 that are communicatively connected to exchange data and messages.

An interaction client 204 interacts with other interaction clients 204 and with the server system 210 via the network 208. The data exchanged between the interaction clients 204 (e.g., interactions 220) and between the interaction clients 204 and the server system 210 includes functions (e.g., commands to invoke functions) and payload data (e.g., text, audio, video, or other multimedia data).

The server system 210 provides server-side functionality via the network 208 to the interaction clients 204. While certain functions of the digital interaction system 200 are described herein as being performed by either an interaction client 204 or by the server system 210, the location of certain functionality either within the interaction client 204 or the server system 210 can be a design choice. For example, it can be technically preferable to initially deploy particular technology and functionality within the server system 210 but to later migrate this technology and functionality to the interaction client 204 where a user system 202 has sufficient processing capacity.

The server system 210 supports various services and operations that are provided to the interaction clients 204. Such operations include transmitting data to, receiving data from, and processing data generated by the interaction clients 204. This data can include message content, client device information, geolocation information, digital effects (e.g., media augmentation and overlays), message content persistence conditions, entity relationship information, and live event information. Data exchanges within the digital interaction system 200 are invoked and controlled through functions available via user interfaces (UIs) of the interaction clients 204.

Turning now specifically to the server system 210, an Application Program Interface (API) server 222 is coupled to and provides programmatic interfaces to servers 224, making the functions of the servers 224 accessible to interaction clients 204, other applications 206 and third-party server 212. The servers 224 are communicatively coupled to a database server 226, facilitating access to a database 228 that stores data associated with interactions processed by the servers 224. Similarly, a web server 230 is coupled to the servers 224 and provides web-based interfaces to the servers 224. To this end, the web server 230 processes incoming network requests over the Hypertext Transfer Protocol (HTTP) and several other related protocols.

The Application Program Interface (API) server 222 receives and transmits interaction data (e.g., commands and message payloads) between the servers 224 and the user systems 202 (and, for example, interaction clients 204 and other application 206) and the third-party server 212. Specifically, the Application Program Interface (API) server 222 provides a set of interfaces (e.g., routines and protocols) that can be called or queried by the interaction client 204 and other applications 206 to invoke functionality of the servers 224. The Application Program Interface (API) server 222 exposes various functions supported by the servers 224, including account registration; login functionality; the sending of interaction data, via the servers 224, from a particular interaction client 204 to another interaction client 204; the communication of media files (e.g., images or video) from an interaction client 204 to the servers 224; the settings of a collection of media data (e.g., a narrative); the retrieval of a list of friends of a user of a user system 202; the retrieval of messages and content; the addition and deletion of entities (e.g., friends) to an entity relationship graph (e.g., the entity graph 1108); the location of friends within an entity relationship graph; and opening an application event (e.g., relating to the interaction client 204).

The servers 224 host multiple systems and subsystems, described below with reference to FIG. 10.

The interaction client 204 provides a user interface that allows users to access features and functions of an external resource, such as a linked application 206, an applet, or a microservice. This external resource can be provided by a third party or by the creator of the interaction client 204.

The external resource can be a full-scale application installed on the user's system 202, or a smaller, lightweight version of the application, such as an applet or a microservice, hosted either on the user's system or remotely, such as on third-party servers 212 or in the cloud. These smaller versions, which include a subset of the full application's features, can be implemented using a markup-language document and can also incorporate a scripting language and a style sheet.

When a user selects an option to launch or access the external resource, the interaction client 204 determines whether the resource is web-based or a locally installed application. Locally installed applications can be launched independently of the interaction client 204, while applets and microservices can be launched or accessed via the interaction client 204.

If the external resource is a locally installed application, the interaction client 204 instructs the user's system to launch the resource by executing locally stored code. If the resource is web-based, the interaction client 204 communicates with third-party servers to obtain a markup-language document corresponding to the selected resource, which it then processes to present the resource within its user interface.

The interaction client 204 can also notify users of activity in one or more external resources. For instance, it can provide notifications relating to the use of an external resource by one or more members of a user group. Users can be invited to join an active external resource or to launch a recently used but currently inactive resource.

The interaction client 204 can present a list of available external resources to a user, allowing them to launch or access a given resource. This list can be presented in a context-sensitive menu, with icons representing different applications, applets, or microservices varying based on how the menu is launched by the user.

System with Head-Wearable Apparatus

Figure 3:
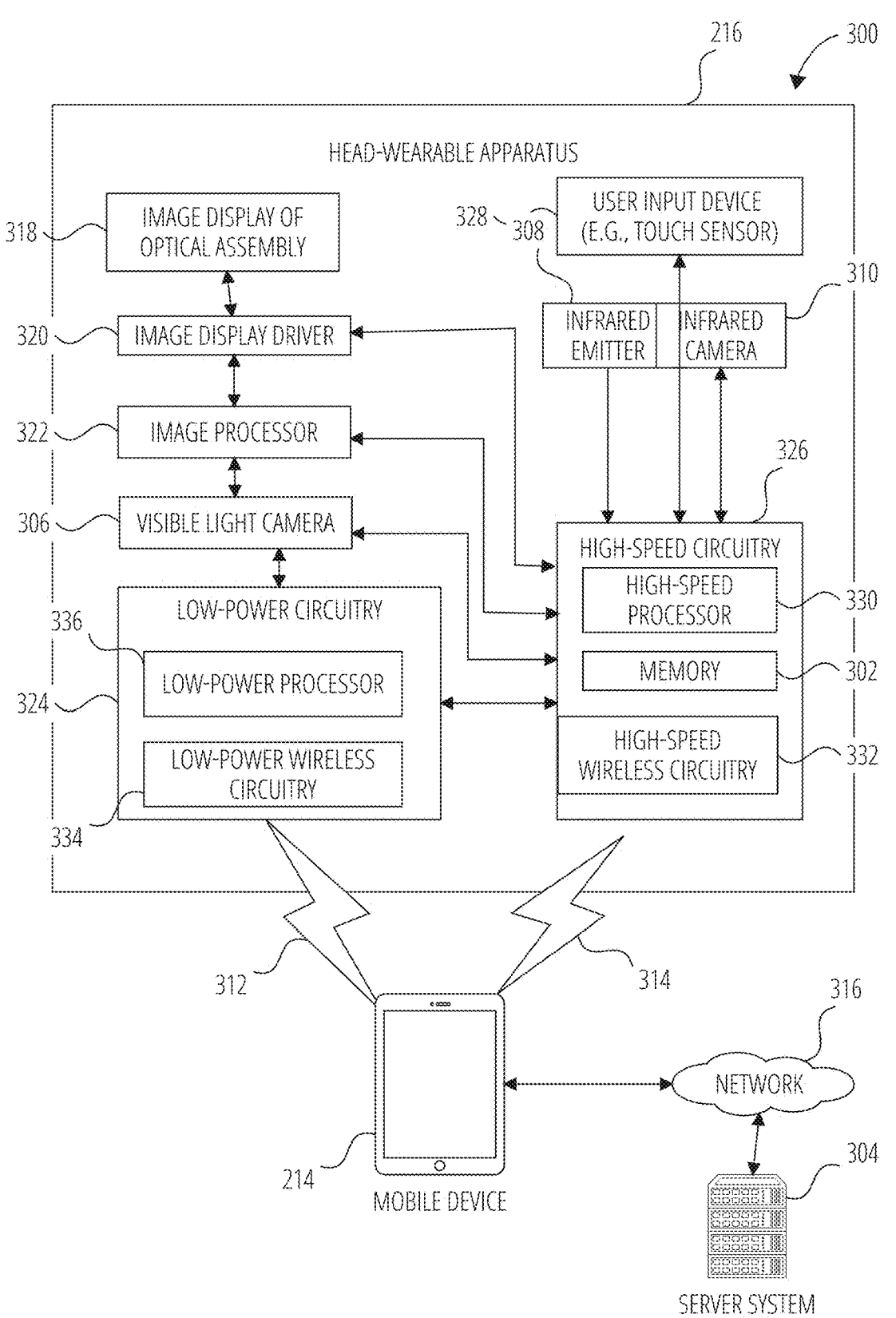
FIG. 3 illustrates a system in which the head-wearable apparatus is operably connected to a mobile device, according to some examples.

FIG. 3 illustrates a system 300 including a head-wearable apparatus 216 with a selector input device, according to some examples. FIG. 3 is a high-level functional block diagram of an example head-wearable apparatus 216 communicatively coupled to a mobile device 214 and various server systems 304 (e.g., the server system 210) via various networks 208.

The head-wearable apparatus 216 includes one or more cameras, each of which can be, for example, a visible light camera 306, an infrared emitter 308, and an infrared camera 310.

The mobile device 214 connects with head-wearable apparatus 216 using both a low-power wireless connection 312 and a high-speed wireless connection 314. The mobile device 214 is also connected to the server system 304 and the Network 316.

The head-wearable apparatus 216 further includes two image displays of the image display of optical assembly 318. The two image displays of optical assembly 318 include one associated with the left lateral side and one associated with the right lateral side of the head-wearable apparatus 216.

The head-wearable apparatus 216 also includes an image display driver 320, an image processor 322, low-power circuitry 324, and high-speed circuitry 326. The image display of optical assembly 318 is for presenting images and videos, including an image that can include a graphical user interface to a user of the head-wearable apparatus 216.

The image display driver 320 commands and controls the image display of optical assembly 318. The image display driver 320 can deliver image data directly to the image display of optical assembly 318 for presentation or can convert the image data into a signal or data format suitable for delivery to the image display device. For example, the image data can be video data formatted according to compression formats, such as H.264 (MPEG-4 Part 10), HEVC, Theora, Dirac, RealVideo RV40, VP8, VP9, or the like, and still image data can be formatted according to compression formats such as Portable Network Group (PNG), Joint Photographic Experts Group (JPEG), Tagged Image File Format (TIFF) or exchangeable image file format (EXIF) or the like.

The head-wearable apparatus 216 includes a frame and stems (or temples) extending from a lateral side of the frame. The head-wearable apparatus 216 further includes a user input device 328 (e.g., touch sensor or push button), including an input surface on the head-wearable apparatus 216. The user input device 328 (e.g., touch sensor or push button) is to receive from the user an input selection to manipulate the graphical user interface of the presented image.

The components shown in FIG. 3 for the head-wearable apparatus 216 are located on one or more circuit boards, for example a PCB or flexible PCB, in the rims or temples. Alternatively, or additionally, the depicted components can be located in the chunks, frames, hinges, or bridge of the head-wearable apparatus 216. Left and right visible light cameras 306 can include digital camera elements such as a complementary metal oxide-semiconductor (CMOS) image sensor, charge-coupled device, camera lenses, or any other respective visible or light-capturing elements that can be used to capture data, including images of scenes with unknown objects.

The head-wearable apparatus 216 includes a memory 302, which stores instructions to perform a subset, or all the functions described herein. The memory 302 can also include storage device.

As shown in FIG. 3, the high-speed circuitry 326 includes a high-speed processor 330, a memory 302, and high-speed wireless circuitry 332. In some examples, the image display driver 320 is coupled to the high-speed circuitry 326 and operated by the high-speed processor 330 to drive the left and right image displays of the image display of optical assembly 318. The high-speed processor 330 can be any processor capable of managing high-speed communications and operation of any general computing system needed for the head-wearable apparatus 216. The high-speed processor 330 includes processing resources needed for managing high-speed data transfers on a high-speed wireless connection 314 to a wireless local area network (WLAN) using the high-speed wireless circuitry 332. In certain examples, the high-speed processor 330 executes an operating system such as a LINUX operating system or other such operating system of the head-wearable apparatus 216, and the operating system is stored in the memory 302 for execution. In addition to any other responsibilities, the high-speed processor 330 executing a software architecture for the head-wearable apparatus 216 is used to manage data transfers with high-speed wireless circuitry 332. In certain examples, the high-speed wireless circuitry 332 is configured to implement Institute of Electrical and Electronic Engineers (IEEE) 802.11 communication standards, also referred to herein as WI-FI®. In some examples, other high-speed communications standards can be implemented by the high-speed wireless circuitry 332.

The low-power wireless circuitry 334 and the high-speed wireless circuitry 332 of the head-wearable apparatus 216 can include short-range transceivers (e.g., Bluetooth™, Bluetooth LE, Zigbee, ANT+) and wireless wide, local, or wide area Network transceivers (e.g., cellular or WI-FI®). Mobile device 214, including the transceivers communicating via the low-power wireless connection 312 and the high-speed wireless connection 314, can be implemented using details of the architecture of the head-wearable apparatus 216, as can other elements of the Network 316.

The memory 302 includes any storage device capable of storing various data and applications, including, among other things, camera data generated by the left and right visible light cameras 306, the infrared camera 310, and the image processor 322, as well as images generated for display by the image display driver 320 on the image displays of the image display of optical assembly 318. While the memory 302 is shown as integrated with high-speed circuitry 326, in some examples, the memory 302 can be an independent standalone element of the head-wearable apparatus 216. In certain such examples, electrical routing lines can provide a connection through a chip that includes the high-speed processor 330 from the image processor 322 or the low-power processor 336 to the memory 302. In some examples, the high-speed processor 330 can manage addressing of the memory 302 such that the low-power processor 336 will boot the high-speed processor 330 any time that a read or write operation involving memory 302 is needed.

As shown in FIG. 3, the low-power processor 336 or high-speed processor 330 of the head-wearable apparatus 216 can be coupled to the camera (visible light camera 306, infrared emitter 308, or infrared camera 310), the image display driver 320, the user input device 328 (e.g., touch sensor or push button), and the memory 302.

The head-wearable apparatus 216 is connected to a host computer. For example, the head-wearable apparatus 216 is paired with the mobile device 214 via the high-speed wireless connection 314 or connected to the server system 304 via the Network 316. The server system 304 can be one or more computing devices as part of a service or network computing system, for example, that includes a processor, a memory, and network communication interface to communicate over the Network 316 with the mobile device 214 and the head-wearable apparatus 216.

The mobile device 214 includes a processor and a Network communication interface coupled to the processor. The Network communication interface allows for communication over the Network 316, low-power wireless connection 312, or high-speed wireless connection 314. Mobile device 214 can further store at least portions of the instructions in the memory of the mobile device 214 memory to implement the functionality described herein.

Output components of the head-wearable apparatus 216 include visual components, such as a display such as a liquid crystal display (LCD), a plasma display panel (PDP), a light-emitting diode (LED) display, a projector, or a waveguide. The image displays of the optical assembly are driven by the image display driver 320. The output components of the head-wearable apparatus 216 further include acoustic components (e.g., speakers), haptic components (e.g., a vibratory motor), other signal generators, and so forth. The input components of the head-wearable apparatus 216, the mobile device 214, and server system 304, such as the user input device 328, can include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 216 can also include additional peripheral device elements. Such peripheral device elements can include sensors and display elements integrated with the head-wearable apparatus 216. For example, peripheral device elements can include any I/O components including output components, motion components, position components, or any other such elements described herein.

In some examples, the head-wearable apparatus 216 can include biometric components or sensors to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components can include a brain-machine interface (BMI) system that allows communication between the brain and an external device or machine. This can be achieved by recording brain activity data, translating this data into a format that can be understood by a computer, and then using the resulting signals to control the device or machine.

Example types of BMI technologies, including:

Electroencephalography (EEG) based BMIs, which record electrical activity in the brain using electrodes placed on the scalp.

Invasive BMIs, which used electrodes that are surgically implanted into the brain.

Optogenetics BMIs, which use light to control the activity of specific nerve cells in the brain.

Any biometric data collected by the biometric components is captured and stored with only user approval and deleted on user request, and in accordance with applicable laws. Further, such biometric data can be used for very limited purposes, such as identification verification. To ensure limited and authorized use of biometric information and other personally identifiable information (PII), access to this data is restricted to authorized personnel only, if at all. Any use of biometric data can strictly be limited to identification verification purposes, and the biometric data is not shared or sold to any third party without the explicit consent of the user. In addition, appropriate technical and organizational measures are implemented to ensure the security and confidentiality of this sensitive information.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude can be derived), orientation sensor components (e.g., magnetometers), and the like. Such positioning system coordinates can also be received over low-power wireless connections 312 and high-speed wireless connection 314 from the mobile device 214 via the low-power wireless circuitry 334 or high-speed wireless circuitry 332.

Figure 4:
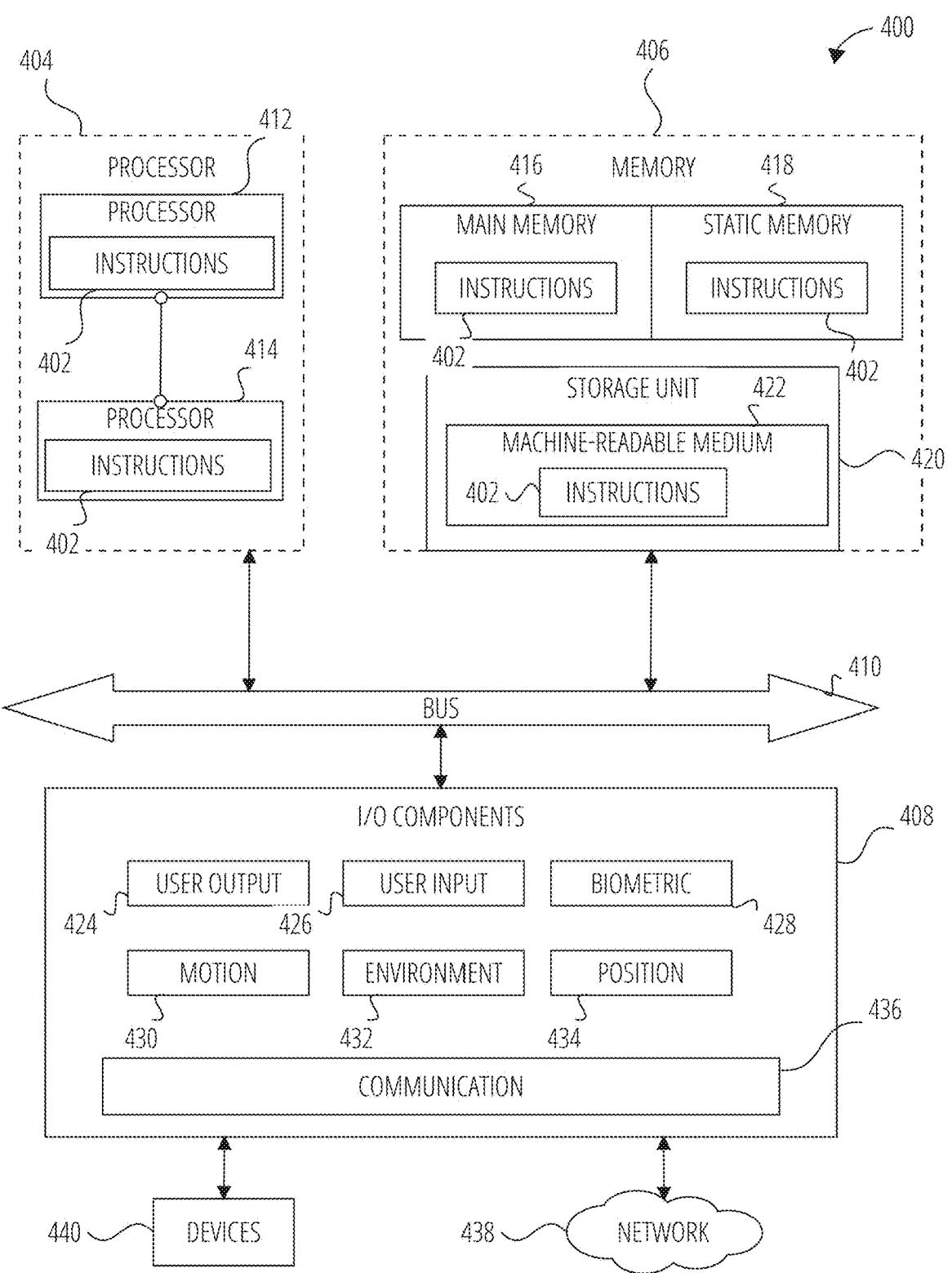
FIG. 4 is a diagrammatic representation of a machine in the form of a computer system within which a set of instructions can be executed to cause the machine to perform any one or more of the methodologies discussed herein, according to some examples.

FIG. 4 is a diagrammatic representation of the machine 400 within which instructions 402 (e.g., software, a program, an application, an applet, an app, or other executable code) for causing the machine 400 to perform any one or more of the methodologies discussed herein can be executed. For example, the instructions 402 can cause the machine 400 to execute any one or more of the methods described herein. The instructions 402 transform the general, non-programmed machine 400 into a particular machine 400 programmed to carry out the described and illustrated functions in the manner described. The machine 400 can operate as a standalone device or can be coupled (e.g., networked) to other machines. In a networked deployment, the machine 400 can operate in the capacity of a server machine or a client machine in a server-client network environment, or as a peer machine in a peer-to-peer (or distributed) network environment. The machine 400 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 402, sequentially or otherwise, that specify actions to be taken by the machine 400. Further, while a single machine 400 is illustrated, the term "machine" shall also be taken to include a collection of machines that individually or jointly execute the instructions 402 to perform any one or more of the methodologies discussed herein. The machine 400, for example, can comprise the user system 202 or any one of multiple server devices forming part of the server system 210. In some examples, the machine 400 can also comprise both client and server systems, with certain operations of a particular method or algorithm being performed on the server-side and with certain operations of the method or algorithm being performed on the client-side.

The machine 400 can include one or more processor 404, memory 406, and input/output I/O components 408, which can be configured to communicate with each other via a bus 410.

The processor 404 can comprise one or more processors such as, but not limited to, processor 412 and processor 414. The one or more processors can comprise one or more types of processing systems such as, but not limited to, Central Processing Units (CPUs), Graphics Processing Units (GPUs), Digital Signal Processors (DSPs), Neural Processing Units (NPUs) or AI Accelerators, Physics Processing Units (PPUs), Field-Programmable Gate Arrays (FPGAs), Multi-core Processors, Symmetric Multiprocessing (SMP) Systems, and the like.

The memory 406 includes a main memory 416, a static memory 418, and a storage unit 420, both accessible to the processor 404 via the bus 410. The main memory 406, the static memory 418, and storage unit 420 store the instructions 402 embodying any one or more of the methodologies or functions described herein. The instructions 402 can also reside, completely or partially, within the main memory 416, within the static memory 418, within machine-readable medium 422 within the storage unit 420, within at least one of the processor 404 (e.g., within the processor's cache memory), or any suitable combination thereof, during execution thereof by the machine 400.

The I/O components 408 can include a wide variety of components to receive input, provide output, produce output, transmit information, exchange information, capture measurements, and so on. The specific I/O components 408 that are included in a particular machine will depend on the type of machine. For example, portable machines such as mobile phones can include a touch input device or other such input mechanisms, while a headless server machine will likely not include such a touch input device. It will be appreciated that the I/O components 408 can include many other components that are not shown in FIG. 4. In various examples, the I/O components 408 can include user output components 424 and user input components 426. The user output components 424 can include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 426 can include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 408 can include biometric components 428, motion components 430, environmental components 432, or position components 434, among a wide array of other components. For example, the biometric components 428 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components can include a brain-machine interface (BMI) system that allows communication between the brain and an external device or machine. This can be achieved by recording brain activity data, translating this data into a format that can be understood by a computer, and then using the resulting signals to control the device or machine.

Example types of BMI technologies, including:

Electroencephalography (EEG) based BMIs, which record electrical activity in the brain using electrodes placed on the scalp.

Invasive BMIs, which used electrodes that are surgically implanted into the brain.

Optogenetics BMIs, which use light to control the activity of specific nerve cells in the brain.

Any biometric data collected by the biometric components is captured and stored only with user approval and deleted on user request, and in accordance with applicable laws. Further, such biometric data can be used for very limited purposes, such as identification verification. To ensure limited and authorized use of biometric information and other personally identifiable information (PII), access to this data is restricted to authorized personnel only, if at all. Any use of biometric data can strictly be limited to identification verification purposes, and the data is not shared or sold to any third party without the explicit consent of the user. In addition, appropriate technical and organizational measures are implemented to ensure the security and confidentiality of this sensitive information.

The motion components 430 include acceleration sensor components (e.g., accelerometer), gravitation sensor components, rotation sensor components (e.g., gyroscope).

The environmental components 432 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that can provide indications, measurements, or signals corresponding to a surrounding physical environment.

With respect to cameras, the user system 202 can have a camera system comprising, for example, front cameras on a front surface of the user system 202 and rear cameras on a rear surface of the user system 202. The front cameras can, for example, be used to capture still images and video of a user of the user system 202 (e.g., "selfies"), which can then be modified with digital effect data (e.g., filters) described above. The rear cameras can, for example, be used to capture still images and videos in a more traditional camera mode, with these images similarly being modified with digital effect data. In addition to front and rear cameras, the user system 202 can also include a 360° camera for capturing 360° photographs and videos.

Moreover, the camera system of the user system 202 can be equipped with advanced multi-camera configurations. This can include dual rear cameras, which might consist of a primary camera for general photography and a depth-sensing camera for capturing detailed depth information in a scene. This depth information can be used for various purposes, such as creating a bokeh effect in portrait mode, where the subject is in sharp focus while the background is blurred. In addition to dual camera setups, the user system 202 can also feature triple, quad, or even penta camera configurations on both the front and rear sides of the user system 202. These multiple cameras systems can include a wide camera, an ultra-wide camera, a telephoto camera, a macro camera, and a depth sensor, for example.

Communication can be implemented using a wide variety of technologies. The I/O components 408 further include communication components 436 operable to couple the machine 400 to a Network 438 or devices 440 via respective coupling or connections. For example, the communication components 436 can include a network interface component or another suitable device to interface with the Network 438. In further examples, the communication components 436 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 440 can be another machine or any of a wide variety of peripheral devices (e.g., a peripheral device coupled via a USB).

Moreover, the communication components 436 can detect identifiers or include components operable to detect identifiers. For example, the communication components 436 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information can be derived via the communication components 436, such as location via Internet Protocol (IP) geolocation, location via Wi-Fi® signal triangulation, location via detecting an NFC beacon signal that can indicate a particular location, and so forth.

The various memories (e.g., main memory 416, static memory 418, and memory of the processor 404) and storage unit 420 can store one or more sets of instructions and data structures (e.g., software) embodying or used by any one or more of the methodologies or functions described herein. These instructions (e.g., the instructions 402), when executed by processor 404, cause various operations to implement the disclosed examples.

The instructions 402 can be transmitted or received over the Network 438, using a transmission medium, via a network interface device (e.g., a network interface component included in the communication components 436) and using any one of several well-known transfer protocols (e.g., hypertext transfer protocol (HTTP)). Similarly, the instructions 402 can be transmitted or received using a transmission medium via a coupling (e.g., a peer-to-peer coupling) to the devices 440.

Figure 5A:
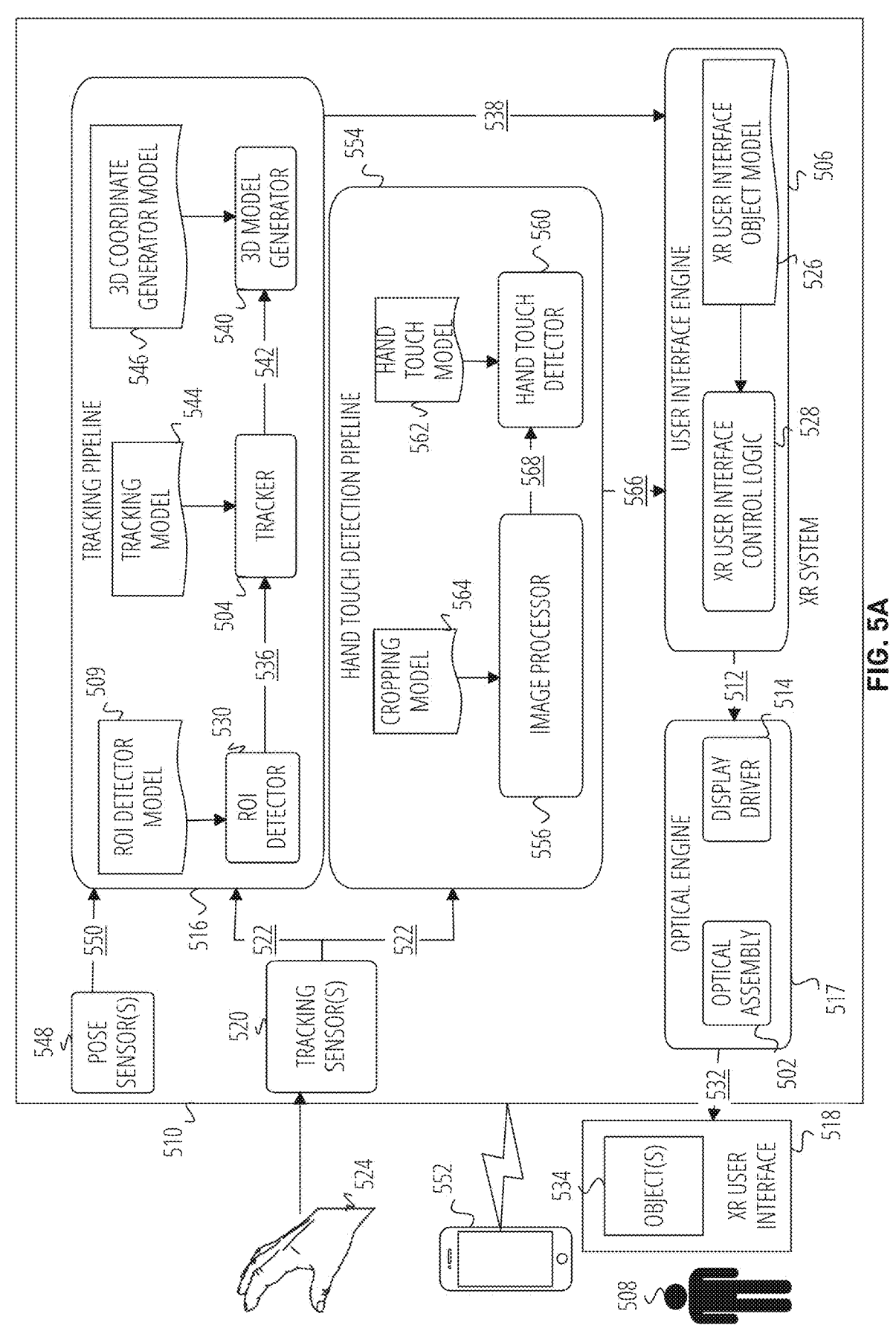
FIG. 5A illustrates a collaboration diagram of components of an XR system using hand-tracking for user input, according to some examples.

FIG. 5A illustrates a collaboration diagram of components of an XR system 510, such as head-wearable apparatus 100 of FIG. 1A, using hand-tracking for user input, according to some examples.

The XR system 510 uses 3D tracking data 538 and hand touch data 566 to provide a continuous real-time input modality to a user 508 of the XR system 510 where the user 508 interacts with an XR user interface 518 using hand gestures or hand poses being made by the user 508 using one or both of their hands 524. The XR user interface 518 can be for a useful application such as, but not limited to, a maintenance guide, an interactive map, an interactive tour guide, a tutorial, and the like. The application can also be an entertainment application such as, but not limited to, a video game, an interactive video, and the like.

The XR system 510 generates the XR user interface 518 provided to the user 508 within an XR environment. The XR user interface 518 includes one or more interactive virtual objects 534 that the user 508 can interact with. For example, a user interface engine 506 of FIG. 5A includes XR user interface control logic 528 comprising a dialog script or the like that specifies a user interface dialog implemented by the XR user interface 518. The XR user interface control logic 528 also comprises one or more actions that are to be taken by the XR system 510 based on detecting various dialog events such as user inputs input by the user 508 using the XR user interface 518 and by making hand gestures. The user interface engine 506 further includes an XR user interface object model 526. The XR user interface object model 526 includes 3D coordinate data of the one or more interactive virtual objects 534. The XR user interface object model 526 also includes 3D graphics data of the one or more interactive virtual objects 534. The 3D graphics data is used by an optical engine 517 to generate the XR user interface 518 for display to the user 508.

The user interface engine 506 generates XR user interface data 512 using the XR user interface object model 526. The XR user interface data 512 includes image data of the one or more interactive virtual objects 534 of the XR user interface 518. The user interface engine 506 communicates the XR user interface data 512 to a display driver 514 of an optical engine 517 of the XR system 510. The display driver 514 receives the XR user interface data 512 and generates display control signals using the XR user interface data 512. The display driver 514 uses the display control signals to control the operations of one or more optical assemblies 502 of the optical engine 517. In response to the display control signals, the one or more optical assemblies 502 generate an XR user interface graphics display 532 of the XR user interface 518 that is provided to the user 508 in the XR user interface 518 provided to the user 508.

While in use, the XR system 510 uses one or more tracking sensors 520 to detect and record a position, orientation, and gestures of the hands 524 of the user 508. This can involve capturing the speed and trajectory of hand movements, recognizing specific hand poses, and determining the relative positioning of the hands in the three-dimensional space of an XR environment.

In some examples, the XR system 510 uses the one or more tracking sensors 520 to detect and record positions, orientations, and gestures of portions of the body of the user 508 such as, but not limited to, portions of a wrist, a lower arm, an upper arm, the chest, and the like of the user 508. This can involve capturing the speed and trajectory of movements, recognizing specific poses, and determining the relative positioning of the portions of the body in the three-dimensional space of an XR environment.

In some examples, the one or more tracking sensors 520 comprise an array of optical sensors capable of capturing a wide range of hand movements and gestures in real-time as images. These sensors can include Red Green and Blue (RGB) cameras that capture images of the hands 524 of the user 508 using light having a broad wavelength spectrum, such as natural light provided by the real-world environment or artificial illumination created by one or more incandescent lamps, LED lamps, or the like provided by the XR system 510. In some examples, the one or more tracking sensors 520 can include infrared cameras that capture images of the hands 524 of the user 508 using energy in the infrared radiation (IR) spectrum. The IR energy can be supplied by one or more IR emitters of the XR system 510.

In some examples, the one or more tracking sensors 520 comprise depth-sensing cameras that utilize structured light or time-of-flight technology to create a three-dimensional model of the hands 524 of the user 508. This allows the XR system 510 to detect intricate gestures and finger movements with high accuracy.

In some examples, the one or more tracking sensors 520 comprise ultrasonic sensors that emit sound waves and measure the reflection off the hands 524 of the user 508 to determine their location and movement in space.

In some examples, the one or more tracking sensors 520 comprise electromagnetic field sensors that track the movement of the hands 524 of the user 508 by detecting changes in an electromagnetic field generated around the user 508.

In some examples, the one or more tracking sensors 520 include capacitive sensors embedded in gloves worn by the user 508. These sensors detect hand movements and gestures based on changes in capacitance caused by finger positioning and orientation.

In some examples, the XR system 510 includes one or more pose sensors 548 such as an Inertial Measurement Unit (IMU) and the like, that track the orientation and movements of the XR system of the user 508. The one or more pose sensors 548 are used to determine SixDegrees of Freedom (6DoF) data of movement of the XR system 510 in three-dimensional space. Specifically, the 6DoF data encompasses three translational movements along the x, y, and z axes (forward/back, up/down, left/right) and three rotational movements (pitch, yaw, roll) included in pose data 550. In the context of XR, 6DoF data is allows for the tracking of both position and orientation of an object or user in 3D space.

In some examples, the one or more pose sensors 548 include one or more cameras that capture images of the real-world environment. The images are included in the pose data 550. The XR system 510 uses the images and photogrammetric methodologies to determine 6DoF data of the XR system 510.

In some examples, the XR system 510 uses a combination of an IMU and one or more cameras to determine 6DoF for the XR system 510.

The XR system 510 uses a tracking pipeline 516 including a Region Of Interest (ROI) detector 530, a tracker 504, and a 3D model generator 540, to generate the 3D tracking data 538 using the tracking data 522 and the pose data 550.

The ROI detector 530 uses a ROI detector model 509 to detect a region in the real world environment that includes a hand 524 of the user 508. The ROI detector model 509 is trained to recognize those portions of the real-world environment that include a user's hands as more fully described in reference to FIG. 8A and FIG. 8B. The ROI detector 530 generates ROI data 536 indicating which portions of the tracking data 522 include one or more hands of the user 508 and communicates the ROI data 536 to the tracker 504.

The tracker 504 uses a tracking model 544 to generate 2D tracking data 542. The tracker 504 uses the tracking model 544 to recognize landmark features on portions of the one or both hands 524 of the user 508 captured in the tracking data 522 and within the ROI identified by the ROI detector 530. The tracker 504 extracts landmarks of the one or both hands 524 of the user 508 from the tracking data 522 using computer vision methodologies including, but not limited to, Harris corner detection, Shi-Tomasi corner detection, Scale-Invariant Feature Transform (SIFT), Speeded-Up Robust Features (SURF), Features from Accelerated Segment Test (FAST), Oriented FAST and Rotated BRIEF (ORB), and the like. The tracking model 544 operates on the landmarks to generate the 2D tracking data 542 that includes a sequence of skeletal models of one or more hands of the user 508. The tracking model 544 is trained to generate the 2D tracking data 542 as more fully described in reference to FIG. 8A and FIG. 8B. The tracker communicates the 2D tracking data 542 to the 3D model generator 540.

The 3D model generator 540 receives the 2D tracking data 542 and generates 3D tracking data 538 using the 2D tracking data 542, the pose data 550, and a 3D coordinate generator model 546. For example, the 3D model generator 540 determines a reference position in the real-world environment for the XR system 510. The 3D model generator 540 uses a 3D coordinate generator model 546 that operates on the 2D tracking data 542 to generate the 3D tracking data 538. The 3D coordinate generator model 546 is trained to generate the 3D tracking data 538 as more fully described in reference to FIG. 8A and FIG. 8B.

In some examples, the tracker 504 generates the 3D tracking data 538 using photogrammetry methodologies to create 3D models of the hands of the user 508 from the 2D tracking data 542 by capturing overlapping pictures of the hands of the user 508 from different angles. In some examples, the 2D tracking data 542 includes multiple images taken from different angles, which are then processed to generate the 3D models that are included in the 3D tracking data 538. In some examples, the XR system 510 uses the pose data 550 captured by one or more pose sensors 548 to determine an angle or position of the XR system 510 as an image is captured of the hands hand 524 of the user 508 or other portions of the body of the user 508.

The XR system 510 uses a hand touch detection pipeline 554 including an image processor 556 and a hand touch detector 560 to generate hand touch data 566 using the tracking data 522.

In some examples, the image processor 556 extracts features from the tracking data 522 using computer vision methodologies including, but not limited to, Harris corner detection, Shi-Tomasi corner detection, Scale-Invariant Feature Transform (SIFT), Speeded-Up Robust Features (SURF), Features from Accelerated Segment Test (FAST), Oriented FAST and Rotated BRIEF (ORB), and the like. The image processor 556 operates on the features to generate the cropped image data 568. The image processor 556 is trained to generate the cropped image data 568 as more fully described in reference to FIG. 8A and FIG. 8B.

In some examples, images in the tracking data 522 are processed by an image processor 556 to enhance the images for better clarity and contrast, making it easier for the XR system 510 to extract features from the tracking data 522. In some examples, the image processor 556 uses image enhancement methodologies such as, but not limited to: histogram equalization, which adjusts the contrast of an image by redistributing the intensity values; Gaussian smoothing, which reduces noise and detail by averaging pixel values with a Gaussian kernel; unsharp mask filtering, which enhances edges by subtracting a blurred version of the image from the original; Wiener filtering, which removes noise and deblurs images by accounting for both the degradation function and the statistical properties of noise; Contrast-Limited Adaptive Histogram Equalization (CLAHE), which improves local contrast and enhances the definition of edges in an image; median filtering, which reduces noise by replacing each pixel's value with the median value of the intensities in its neighborhood; point operations, which apply the same transformation to each pixel based on its original value, such as intensity transformations; spatial filtering, which involves convolution of the image with a kernel to achieve effects like blurring or sharpening; and the like.

In some examples, the image processor 556 filters the images to remove background noise and enhance the visibility of the palmar surface or hand dorsal surface and the digit used by the user 508 to make the hand touch. This processing helps the XR system 510 to accurately detect and interpret the specific interactions intended by the user 508. This capability is useful in complex visual environments where background noise could otherwise interfere with the ability of the XR system 510 to correctly detect a hand touch.

Figure 5C:
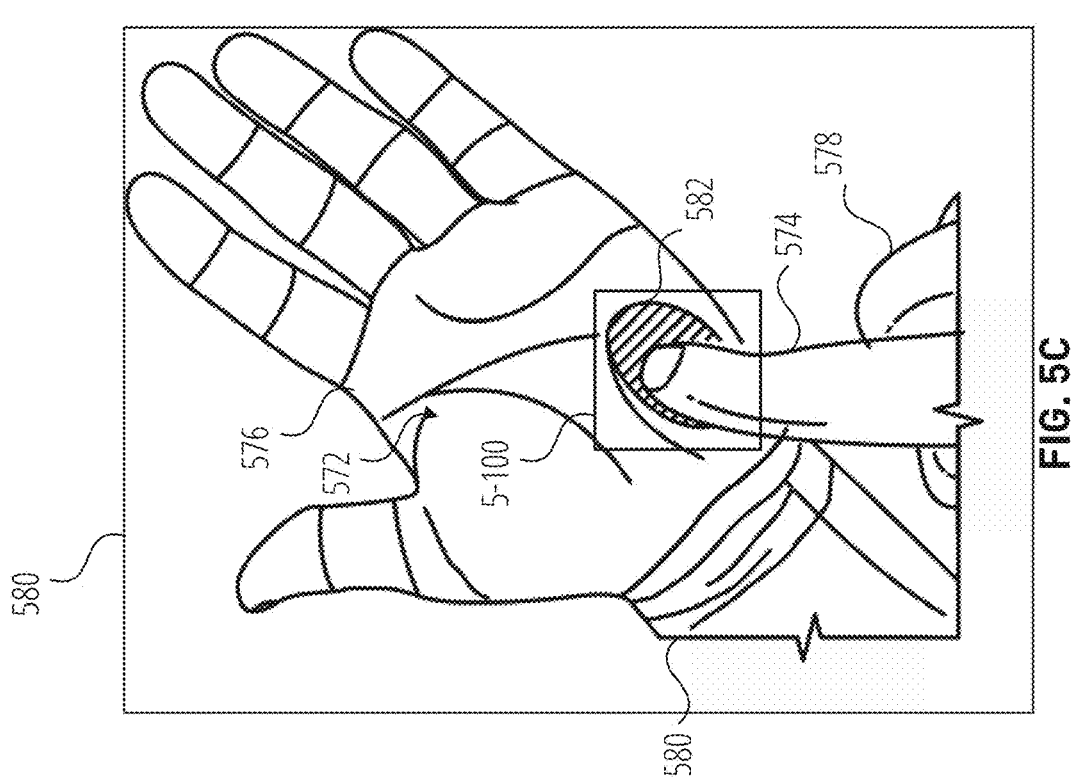
FIG. 5C illustrates a hand touch image of a palmar surface, according to some examples.
Figure 5B:
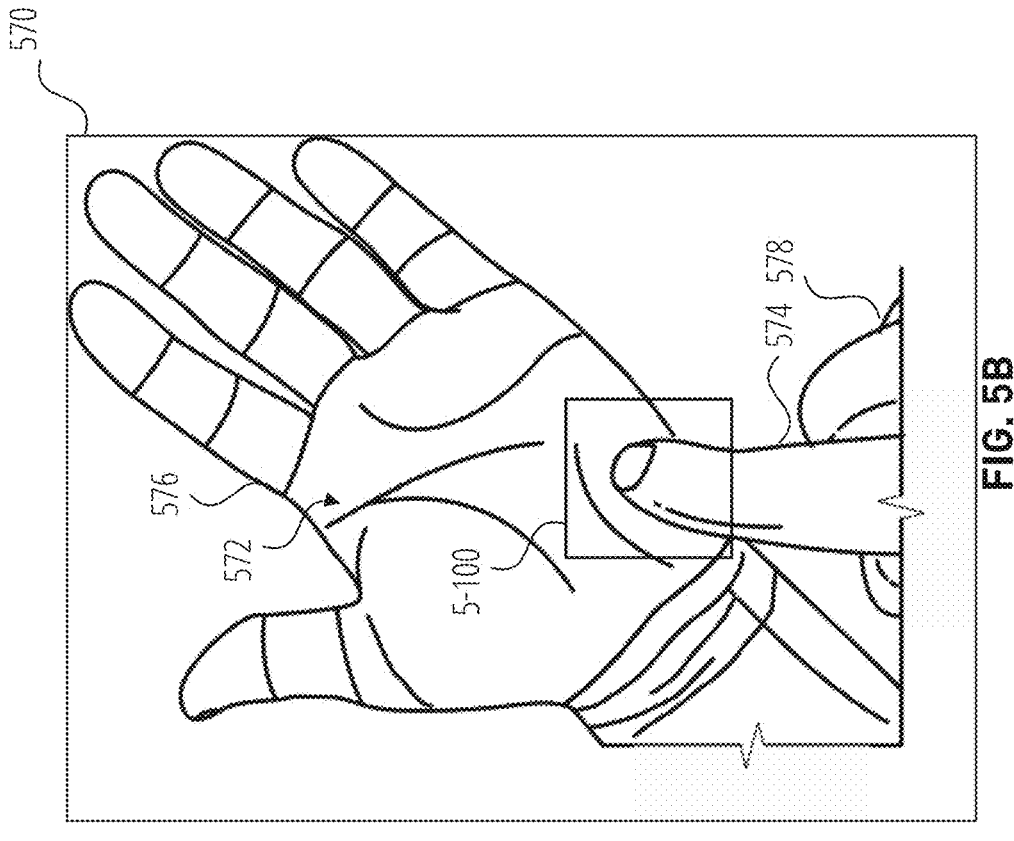
FIG. 5B illustrates a hover position image of a palmar surface, according to some examples.

The image processor 556 detects portions of images of the tracking data 522 that include image data of the hands 524 of the user 508 and crops the images to generate cropped image data 568 including portions of the image data of the hands 524 of the user 508. For example, hover position image 570 of FIG. 5B illustrates an image of a first hand 576 and a second hand 578 of a user including image data of a palmar surface 572 of the first hand 576 and of a digit 574 of the second hand 578. As illustrated, the digit 574 is proximate to without touching the palmar surface 572 and is instead nearly touching or "hovering" over the palmar surface 572. In some examples, the hover position image 570 is cropped to an image portion 5-100 that includes a fingertip portion of the digit 574 and portions of the palmar surface 572 that are in a proximate area of the fingertip portion of the digit 574.

Figure 5E:
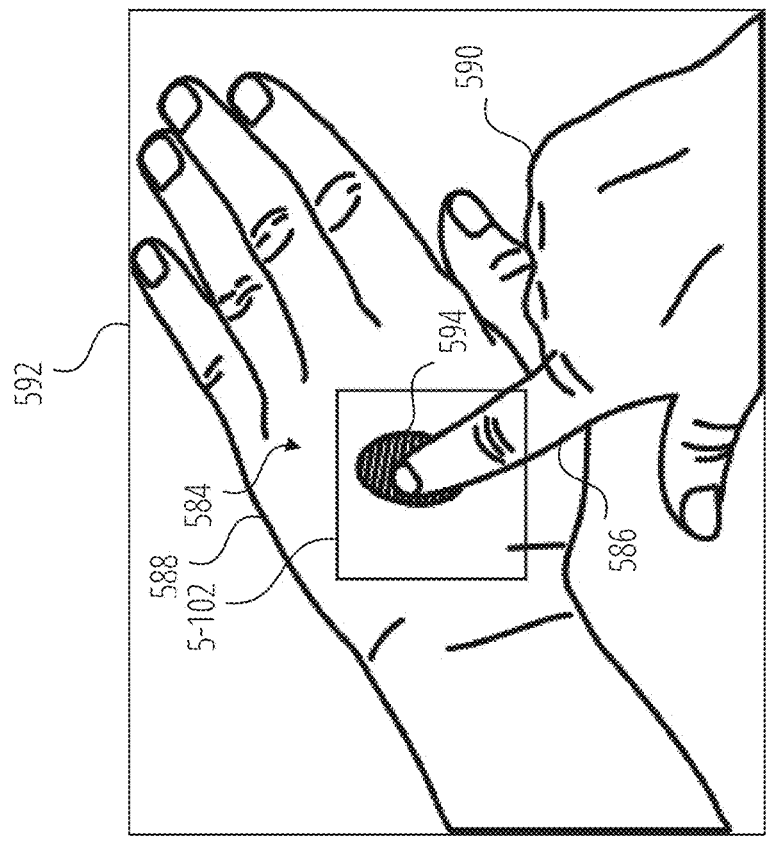
FIG. 5E illustrates a hand touch image of a hand dorsal surface, according to some examples.
Figure 5D:
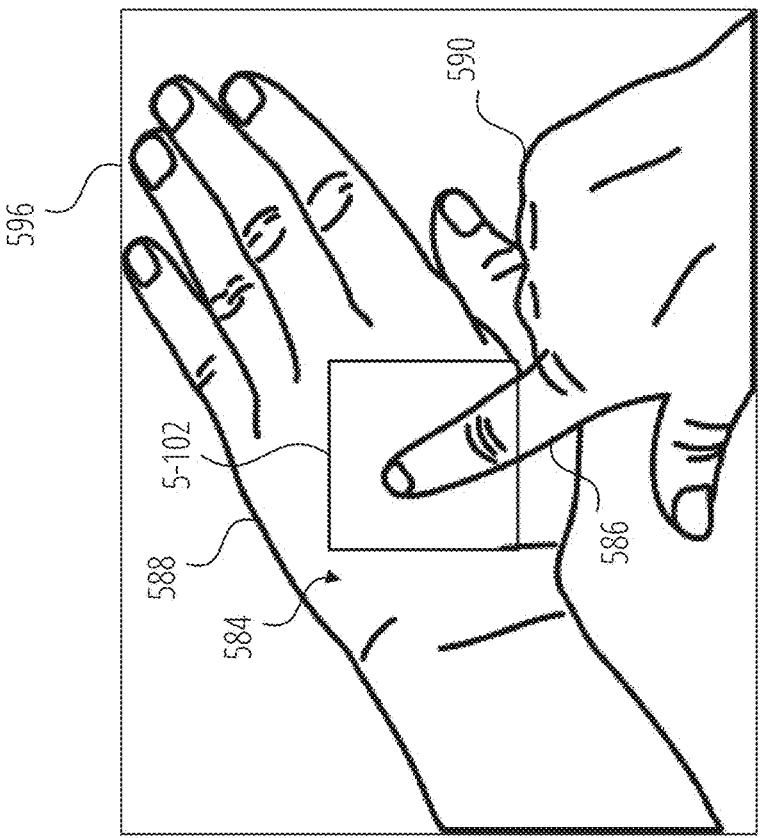
FIG. 5D illustrates a hover position image of a hand dorsal surface, according to some examples.

As another example, hover position image 596 of FIG. 5D illustrates image data of a first hand 588 and a second hand 590 of a user including image data of a hand dorsal surface 584 of the first hand 588 and of a digit 586 of the second hand 590. As illustrated, the digit 586 is proximate to but not touching the hand dorsal surface 584 and is instead nearly touching such as by "hovering" over the hand dorsal surface 584. In some examples, the hover position image 596 is cropped to an image portion 5-102 that includes a fingertip portion of the digit 574 and portions of the hand dorsal surface 584 that are in a proximate area of the fingertip portion of the digit 586.

In some examples, the image processor 556 uses a cropping model 564 to crop the images of the tracking data 522 that include image data of the hands 524 of the user 508. The cropping model 564 is trained to recognize those portions of image data included in the tracking data 522 that include image data of the hands 524 of the user 508 as more fully described in reference to FIG. 8A and FIG. 8B. The image processor 556 generates the cropped image data 568 of the hands 524 of the user 508 and communicates the cropped image data 568 to the hand touch detector 560.

In some examples, the image processor 556 uses a hand tracking process to isolate an area of a palmar surface or hand dorsal surface in images of the hands 524 of the user 508. This process is useful for focusing the analysis on the most relevant part of the hand for interaction, which enhances the system's ability to accurately detect and interpret user inputs. By isolating the area of the palmar surface or hand dorsal surface, the XR system 510 can more effectively process and respond to gestures and touches, improving the overall user experience in XR applications. This targeted processing helps in reducing noise and distractions from other parts of the hand or background, improving the precision and reliability of the touch hand touch detection.

In some examples, the image processor 556 uses the hand tracking process to crop an image to isolate an area around a tip of a digit being used by the user 508 to make a hand touch.

In some examples, the image processor 556 adjusts the cropping of the cropped images to enhance features indicative of the hand touch. This adjustment is useful for improving the accuracy of hand touch detection by focusing on specific areas of the image where hand touch interactions are most likely to occur. By enhancing these features, the XR system 510 can more effectively interpret user inputs, leading to a more responsive and intuitive user experience within the XR environment. This capability is particularly useful for applications requiring precise control and interaction, such as virtual reality gaming or complex navigational tasks in augmented reality settings.

The hand touch detector 560 uses a hand touch model 562 to generate the hand touch data 566. The hand touch detector 560 uses the hand touch model 562 to recognize when the user 508 hand touches a palmar surface or hand dorsal surface of a first one of their hands 524 using one or more digits of a second one of their hands 524. For example, hand touch image 580 of FIG. 5C illustrates a hand touch event of the palmar surface 572 of a first hand 576 of the user by a digit 574 of a second hand 578 of the user. As shown in the hand touch image 580, the digit 574 pressing against the palmar surface 572 generates a deformation 582 in a surface of the palmar surface 572 that can be detected using the image data of the palmar surface 572 included in the hand touch image 580.

As another example, hand touch image 592 of FIG. 5E illustrates a hand touch event of the hand dorsal surface 584 of a first hand 588 of the user by a digit 586 of a second hand 590 of the user. As shown in the hand touch image 592, the digit 586 pressing against the hand dorsal surface 584 generates a deformation 594 in a portion of the hand dorsal surface 584 that can be detected using the image data of the hand dorsal surface 584 included in the hand touch image 592.

In some examples, the palmar surface or hand dorsal surface being touched is the palmar surface or hand dorsal surface of the non-dominant hand of the user and the one or more digits are one or more digits of the dominant hand of the user.

In some examples, the palmar surface or hand dorsal surface being touched is the palmar surface or hand dorsal surface of the dominant hand of the user and the one or more digits are one or more digits of the non-dominant hand of the user.

The hand touch detection pipeline 554 uses a hand touch model 562 trained to generate the hand touch data 566. The hand touch detection pipeline 554 communicates the hand touch data 566 to the user interface engine 506.

Figure 8A:
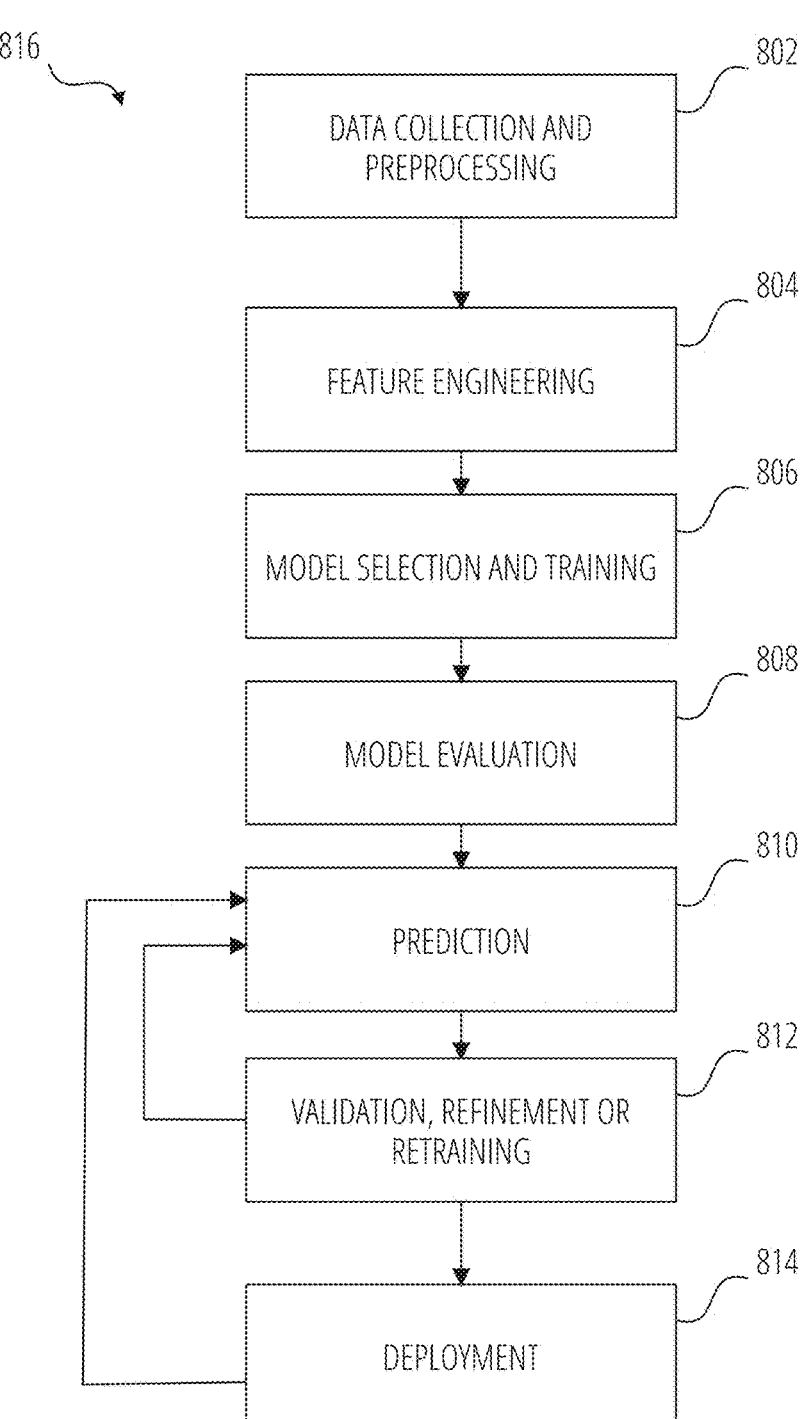
FIG. 8A illustrates a machine-learning pipeline, according to some examples.
Figure 8B:
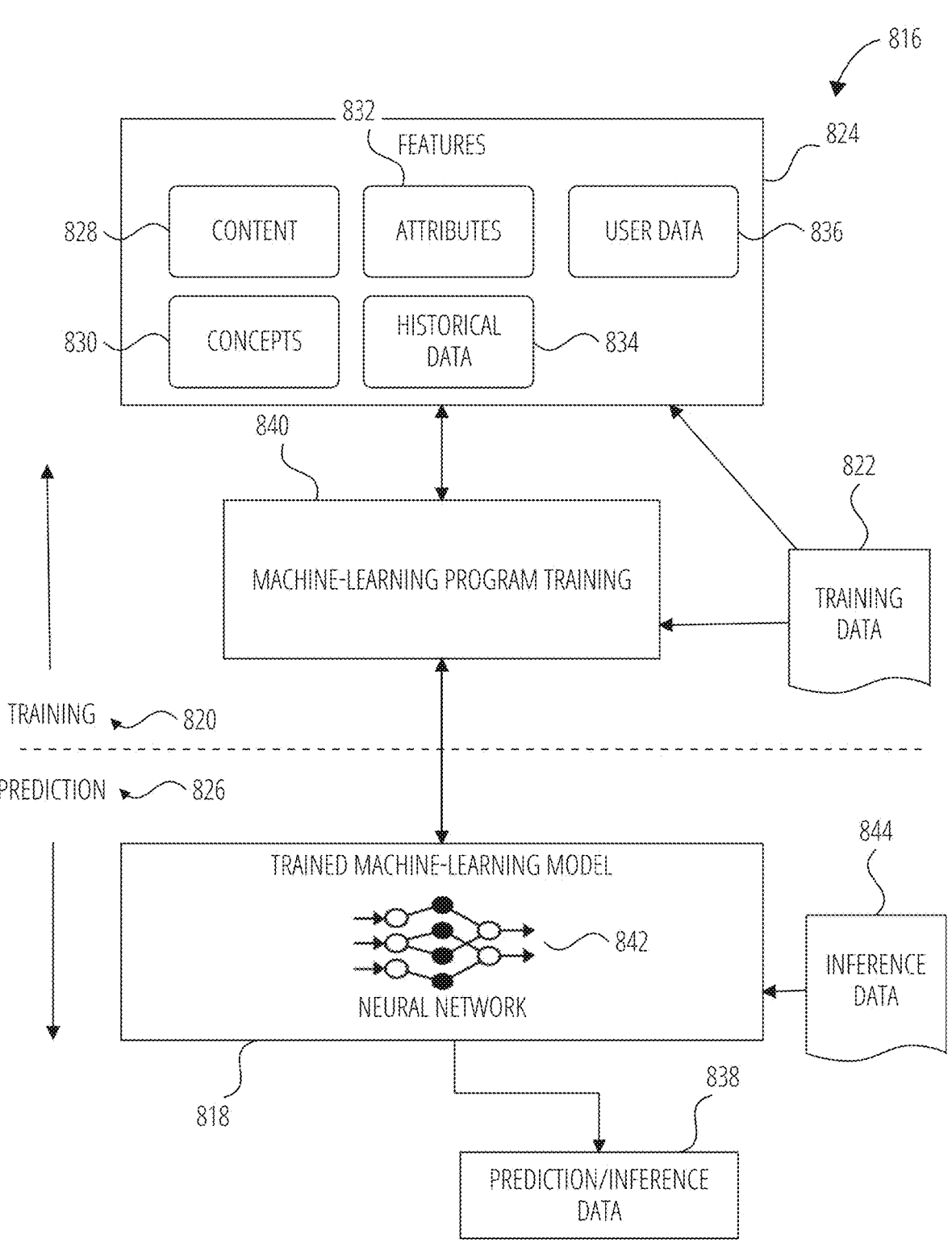
FIG. 8B illustrates training and use of a machine-learning program, according to some examples.

The training of the hand touch model 562 as more fully described in reference to FIG. 8A, FIG. 8B, and FIG. 9. In some examples, the hand touch model 562 is retrained using a training data collected by the XR system as the XR system prompts the user 508 to perform specific operations such as, but not limited to, holding a digit over a palmar surface or hand dorsal surface of one their hands, touching specific portions of their palmar surface or hand dorsal surface, and the like. This retraining process is useful for personalizing the model to the specific characteristics and preferences of the user 508. By incorporating user-specific data, the XR system 510 can enhance hand touch accuracy and responsiveness to a user's unique way of interacting with the XR system 510. This capability is particularly beneficial in applications where user comfort and customization improve the overall experience, such as in personalized virtual assistance or adaptive gaming environments.

In some examples, the hand touch detection sensitivity of the hand touch detection pipeline 554 is calibrated using a set of individual hand characteristics of the user 508. This calibration process is useful for tailoring the system's sensitivity to the unique physical attributes of the user's hands, such as size, shape, and touch pressure tendencies.

In some examples, detecting a hand touch of a palmar surface or hand dorsal surface by a digit of a hand includes interpolating between different hand touch pressure levels detected in the cropped images. For example, the hand touch detector 560 uses the hand touch model 562 to detect variations in visual cues such as, but not limited to, shadowing, indentation, skin deformation, and the like, which are captured in the cropped images. By interpolating these subtle differences, the XR system 510 can determine not just the presence of a touch, but also the varying degrees of pressure applied. In some examples, the hand touch detector 560 generates data of a hand touch that includes a continuous parameter that has a value representing states of a hand touch from a hover state to a hard press state. As an example, a scaler hand pressure level value can be a real number having a range from 0.0 to 2.0 where 0.0 represents a hover of a digit over a palmar surface or hand dorsal surface without making a hand touch, 1.0 represents a regular pressure hand touch, 2.0 represents an extreme pressure hand touch, and a value between 0.0 and 1.0 represents a distance between the digit or a stylus and the palmar surface or hand dorsal surface without a hand touch corresponding to the user holding a digit of one hand or a stylus proximate to but without touching a palmar surface or a hand dorsal surface of another hand.

In some examples, the XR system uses the scaler hand pressure level value of the hand touch pressure level to provide haptic feedback to a user. For example, the user 508 can be instructed to bring a digit of the user 508 close to an interactive virtual object without touching the palmar surface or hand dorsal surface of the user 508 and the user 508 can then sense that they are not touching the palmar surface or hand dorsal surface yet be aware that their digit is close to the palmar surface or hand dorsal surface. The user 508 can be instructed to apply a light pressure to the palmar surface or hand dorsal surface and the user can sense when their digit is lightly touching the palmar surface or hand dorsal surface. The user can be instructed to press their digit firmly against the palmar surface or hand dorsal surface and they can sense when they are applying a heavier pressure to the palmar surface or hand dorsal surface using their digit. The XR system 510 can then determine the scaler hand pressure level value using the hand touch model 562 and use the scaler hand pressure level value as a variable input parameter to an application being executed by the XR system.

In some examples, a centralized server collects data from two or more XR systems to gather training data for training or re-training a hand touch model 562. This centralized approach allows for the aggregation of diverse data sets from multiple sources, enhancing the robustness and accuracy of the hand touch model 562. By pooling data collected under various conditions and from different user interactions, the model can learn to recognize and interpret a wide range of hand touches more effectively. This method ensures that the hand touch model 562 remains adaptive and responsive to new user behaviors or environmental changes, maintaining an XR system's reliability and performance in real-world applications.

In some examples, a hand touch model 562 can detect a hand touch event or a hover event when a user uses a stylus or other object to hover over or press on a palmar surface or a hand dorsal surface.

In some examples, a hand touch model 562 can detect a surface press event similar to a or a hover event when a user uses a digit of a hand to hover over or touch a surface other than a palmar surface or a hand dorsal surface, such as a table surface, a wall surface, an object surface, or the like.

In some examples, a hand touch model 562 can detect hover events and hand touch events when user uses a stylus, a pencil, a pen, or the like to press against their hand or another surface.

In some examples, the one or more tracking sensors 520 include one or more visible light sensors such as, but not limited to, RGB cameras, that capture images of the hands 524 of user 508 included in the tracking data 522. The images are processed by the image processor 556 to emphasize depth cues visible in the hands 524 of the user in the RGB spectrum. In some examples, the XR system 510 comprises one or more visible light emitters such as, but not limited to, Light Emitting Diodes (LEDs) or the like. The emitted visible light enhances the ability of the visible sight sensors to capture images of the hands of the user.

In some examples, the one or more tracking sensors 520 include one or more infrared sensors such as, but not limited to, infrared cameras that capture the images of the hands 524 of user 508 using infrared radiation. In some examples, the XR system comprises one or more infrared emitters such as, but not limited to, infrared Light Emitting Diodes (LEDs) or the like. The infrared radiation enhances the ability of the infrared sensors to capture images of the hands of the user.

In some examples, the XR system 510 uses the one or more tracking sensors 520 to detect and record positions, orientations, and gestures of portions of the body of the user 508 such as, but not limited to, portions of a wrist, a lower arm, an upper arm, the chest, and the like, of the user 508. The XR system 510 can then use one or more touch detection pipelines including one or more cropping models and one or more hand touch models trained to detect touches by the user on those portions of the user's body in a similar manner as detecting hand touches on a palmar surface or hand dorsal surface of a hand of the user.

In some examples, the XR system 510 is operably connected to a mobile device 552. The user 508 can use the mobile device 552 to configure the XR system 510. In some examples, the mobile device 552 functions as an alternative input modality.

In some examples, an XR system performs the functions of the tracking pipeline 516, the hand touch detection pipeline 554, the user interface engine 506, and the optical engine 517 utilizing various APIs and system libraries.

Figure 6C:
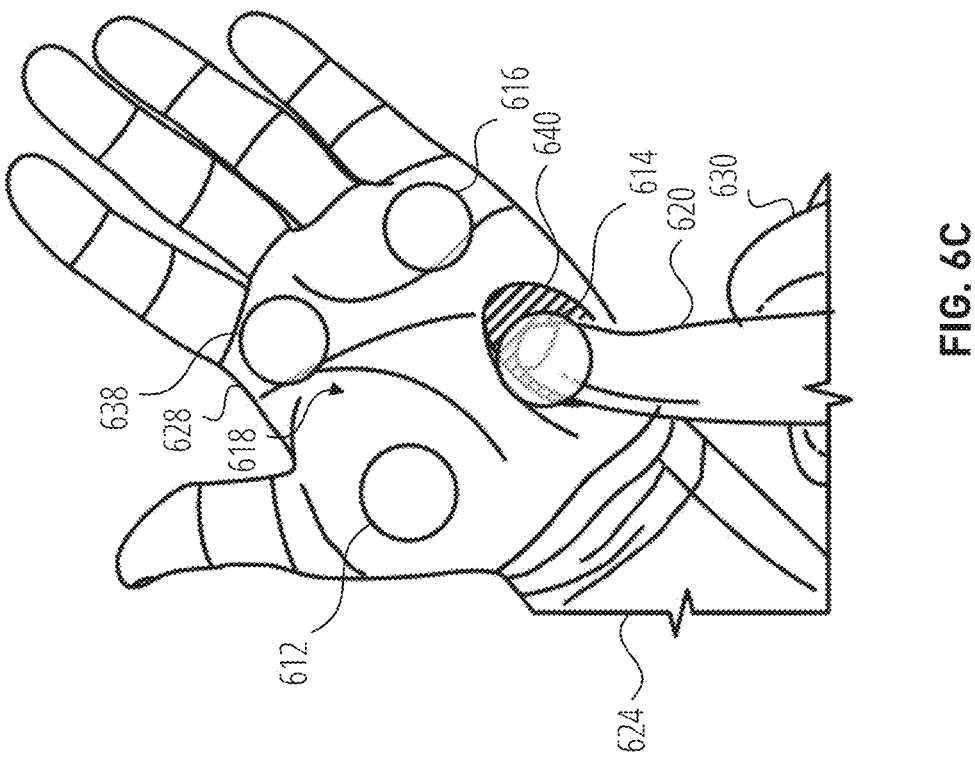
FIG. 6C illustrates a hand touch image of a palmar surface with interactive virtual objects, according to some examples.
Figure 6B:
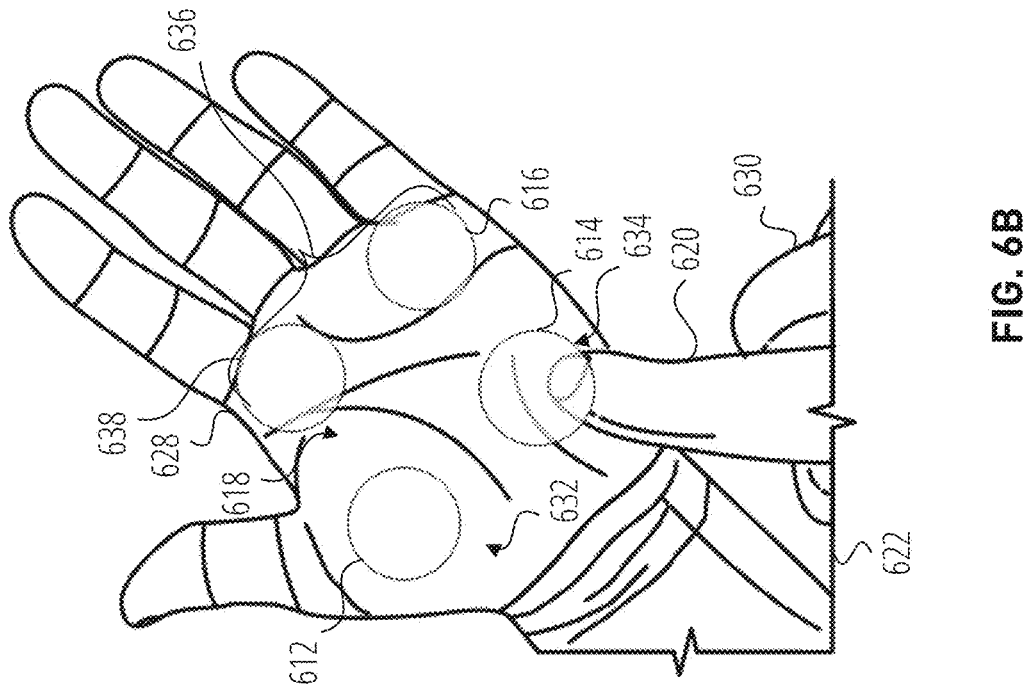
FIG. 6B illustrates a hover position image of a palmar surface with interactive virtual objects, according to some examples.
Figure 6E:
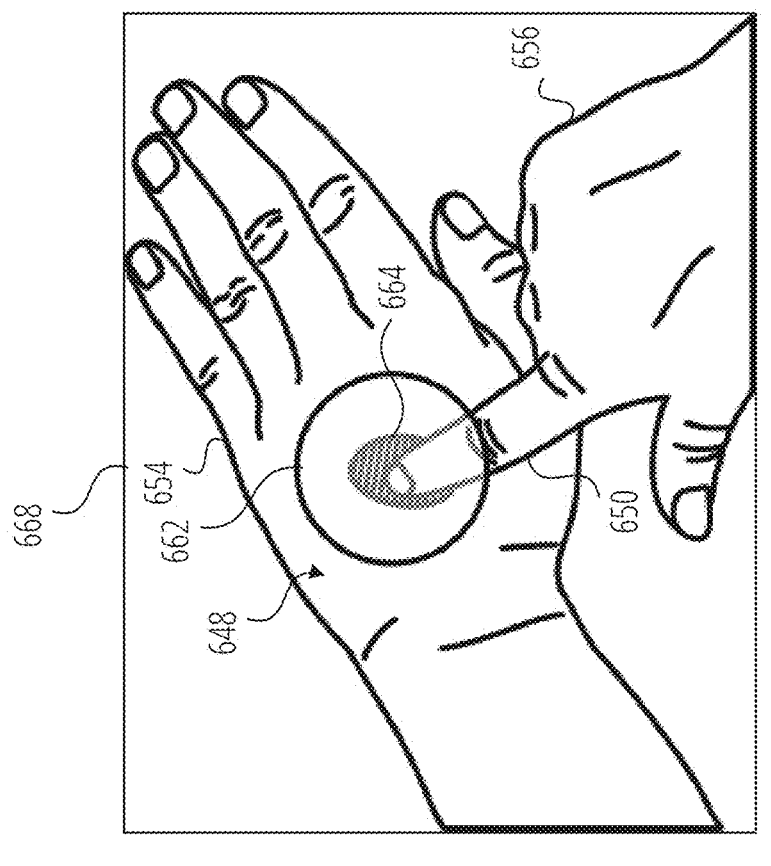
FIG. 6E illustrates a hand touch image of a hand dorsal surface with interactive virtual objects, according to some examples.
Figure 6D:
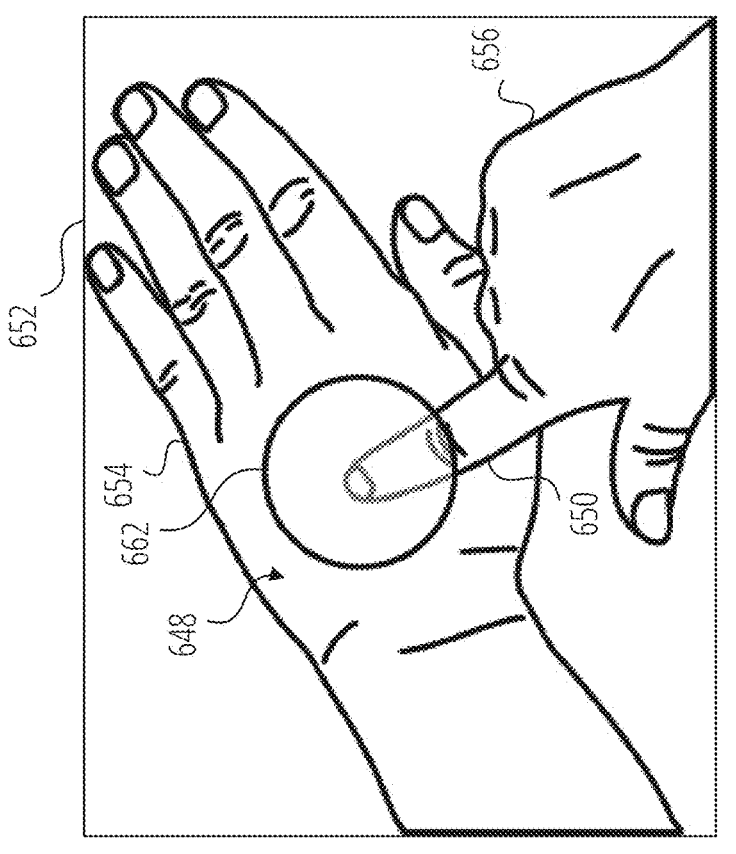
FIG. 6D illustrates a hover position image of a hand dorsal surface with interactive virtual objects, according to some examples.

FIG. 6A illustrates a hand touch input method 600 used by the XR system 510 of FIG. 5A, FIG. 6B illustrates a palmar hover position image 622, FIG. 6C illustrates a palmar hand touch image 624, FIG. 6D illustrates a hand dorsal hover position image 652, and FIG. 6E illustrates a dorsal hand touch image 668, according to some examples. The XR system 510 uses the hand touch input method 600 to detect when a user touches a palmar surface or hand dorsal surface of their hand. The detected hand touch is used as an input into an XR user interface. Although the example hand touch input method 600 depicts a particular sequence of operations, the sequence may be altered without departing from the scope of the present disclosure. For example, some of the operations depicted may be performed in parallel or in a different sequence that does not materially affect the function of the 600. In other examples, different components of the XR system 510 that implement the hand touch input method 600 may perform functions at substantially the same time or in a specific sequence.

In operation 602, the XR system 510 generates an XR user interface, such as XR user interface 518 of FIG. 5A, and provides the XR user interface to a user, such as user 508 of FIG. 5A. For example, the XR system 510 uses the user interface engine 506 of FIG. 5A to generate the XR user interface 518 as more fully described in reference to FIG. 5A. The XR user interface 518 includes one or more interactive virtual objects such as the one or more interactive virtual objects 534 of FIG. 5A. 3D location data of the interactive virtual objects of the XR user interface 518 are stored in the XR user interface object model 526.

In some examples, in reference to FIG. 6B, the one or more interactive virtual objects include interactive virtual object 612, interactive virtual object 614, interactive virtual object 616, and interactive virtual object 638. The one or more interactive virtual objects are provided to the user in association with a specified portion of the palmar surface 618 of the hand 628 of the user. For example, an interactive virtual object can be displayed in association with specific fleshy portions of the palmar surface 618 such as, but not limited to, the thenar eminence 632 at the thumb base, the hypothenar eminence 634 at the little finger side of the palm, one or more interdigital spaces 636 between fingers, and the like.

In some examples, in reference to FIG. 6D, the one or more interactive virtual objects include interactive virtual object 662. The one or more interactive virtual objects are provided to the user in association with a specified portion of a hand dorsal surface 648 of the first hand 654 of the user. The one or more interactive virtual objects are displayed to the user 508 overlaid on the hand dorsal surface 648 of a first hand 654 of the user 508.

In some examples, the interactive virtual objects are displayed on a non-dominant hand of the user and the user uses one or more digits of their dominant hand to touch a palmar surface or hand dorsal surface of the non-dominant hand.

In some examples, interactive virtual objects are displayed on a dominant hand of the user and the user uses one or more digits of their non-dominant hand to touch a palmar surface or hand dorsal surface of the dominant hand.

In operation 604, the XR system 510 captures images including images of the hands 628 and 630. For example, the XR system 510 utilizes one or more cameras included in the one or more tracking sensors 520 of the XR system 510 to capture tracking data 522. The tracking data 522 includes images of the hands 628 and 630 of the user 508 as the user 508 interacts with the XR user interface 518 as more fully described in reference to FIG. 5A.

In operation 606, the XR system 510 generates cropped images using the images of the hands 628 and 630 captured in the tracking data 522. For example, the image processor 556 of FIG. 5A receives the tracking data 522 and uses the cropping model 564 of FIG. 5A to crop the images of the of the hands 628 and 630 as more fully described in reference to FIG. 5A.

In operation 608, the XR system 510 detects a hand touch of a palmar surface or hand dorsal surface of the hand of the user by a digit of the other hand of the user using the cropped images. For example, the XR system 510 uses the hand touch detector 560 of FIG. 5A to detect the hand touch of the palmar surface 618 of the hand 628 by the digit 620 of the other hand 630 using the hand touch model 562 of FIG. 5A as more fully described in reference to FIG. 5A.

In operation 610, the XR system 510 provides the detected hand touch of the palmar surface 618 of the user 508 as an input into the XR user interface 518 provided to the user 508.

In some examples, in reference to FIG. 6C interactive virtual object 612, interactive virtual object 614, interactive virtual object 638, and interactive virtual object 616 are displayed to the user 508 overlaid on a palmar surface 618 of a first hand 628 of the user 508. The user 508 interacts with the interactive virtual object 612, interactive virtual object 614, and interactive virtual object 616 by touching the palmar surface 618 with a digit 620 of a second or other hand 630 to a portion of the palmar surface 618 that corresponds to an apparent location on the palmar surface 618 of the interactive virtual object 612, interactive virtual object 614, and interactive virtual object 616. As the palmar surface 618 is touched by digit 620, a deformation 640 is formed in a fleshy part of the palmar surface that can be detected as a hand touch at the location of the interactive virtual object 614. Hand touch data 566 including data of the hand touch by the digit 620 to the palmar surface 618 of the hand 628 is communicated to the user interface engine 506 by the hand touch detection pipeline 554. Simultaneously, 3D tracking data 538 including data of the 3D location of the hand 628 including the palmar surface 618, and the digit 620 is communicated to the user interface engine 506 by the tracking pipeline 516. The user interface engine 506 receives the hand touch data 566 from the hand touch detection pipeline 554 and the 3D tracking data 538 from the tracking pipeline 516. The user interface engine 506 uses the data of the hand touch to the palmar surface 618, the data of the 3D location of the hand 628 including the palmar surface 618, and the data of the 3D location of interactive virtual object 612, interactive virtual object 614, and interactive virtual object 616 stored in the XR user interface object model 526 to determine if the user 508 has touched their palmar surface 618 a location that corresponds to a location of one or more of the interactive virtual objects 612, 614, and 616. In response to determining that the user 508 has touched their palmar surface 618 a location that corresponds to a location of one or more of the interactive virtual objects 612, 614, and 616, the user interface engine 506 determines that the user 508 has selected and is interacting with the determined interactive virtual object.

In some examples, in reference to FIG. 6E, the user 508 interacts with the one or more interactive virtual objects by touching the hand dorsal surface 648 with a digit 650 of a second hand 656 to a portion of the hand dorsal surface 648 that corresponds to an apparent location on the hand dorsal surface 648 of the one or more interactive virtual objects such as interactive virtual object 662. As the hand dorsal surface 648 is touched by the digit 650, a deformation 664 is formed in a fleshy part of the hand dorsal surface 648 that can be detected as a hand touch at the location of the interactive virtual object 662. Hand touch data 566 including data of the hand touch by the digit 650 to the hand dorsal surface 648 of the first hand 654 is communicated to the user interface engine 506 by the hand touch detection pipeline 554. Simultaneously, 3D tracking data 538 including data of the 3D location of the first hand 654 including the hand dorsal surface 648, and the digit 650 is communicated to the user interface engine 506 by the tracking pipeline 516. The user interface engine 506 receives the hand touch data 566 from the hand touch detection pipeline 554 and the 3D tracking data 538 from the tracking pipeline 516. The user interface engine 506 uses the data of the hand touch to the hand dorsal surface 648, the data of the 3D location of the first hand 654 including the hand dorsal surface 648, and the data of the 3D location of interactive virtual object 662 stored in the XR user interface object model 526 to determine if the user 508 has touched the hand dorsal surface 648 at a location that corresponds to a location of the interactive virtual object 662. In response to determining that the user 508 has touched the hand dorsal surface 648 at a location that corresponds to the location of the interactive virtual object 662, the user interface engine 506 determines that the user 508 has selected and is interacting with the determined interactive virtual object.

In some examples, using the hand touch as an input into the XR user interface 518 includes triggering a virtual button press within the XR user interface 518 in response to detection of the hand touch. This process is useful for enabling direct and intuitive interactions within the XR user interface 518. By translating a physical touch into a virtual action, the XR system 510 enhances the user's ability to interact seamlessly with the digital elements of the XR user interface 518. This capability is particularly beneficial for applications requiring quick and responsive inputs, such as gaming or interactive learning environments, where the immediacy and accuracy of user responses are useful for an engaging experience.

In some examples, an XR system uses one or more tracking sensors to capture tracking data including recorded positions, orientations, and gestures of portions of the body of the user such as, but not limited to, portions of a wrist, a lower arm, an upper arm, the chest, and the like, of the user. The XR system can then use the tracking data to generate an XR user interface including one or more interactive virtual objects that are associated with those portions of the user's body using the methodologies described herein. The XR system can use one or more touch detection pipelines including one or more cropping models and one or more hand touch models trained to detect touches by the user on those portions of the user's body associated with the interactive virtual objects in a similar manner as detecting hand touches on a palmar surface or hand dorsal surface of the user as described herein.

Figure 7:
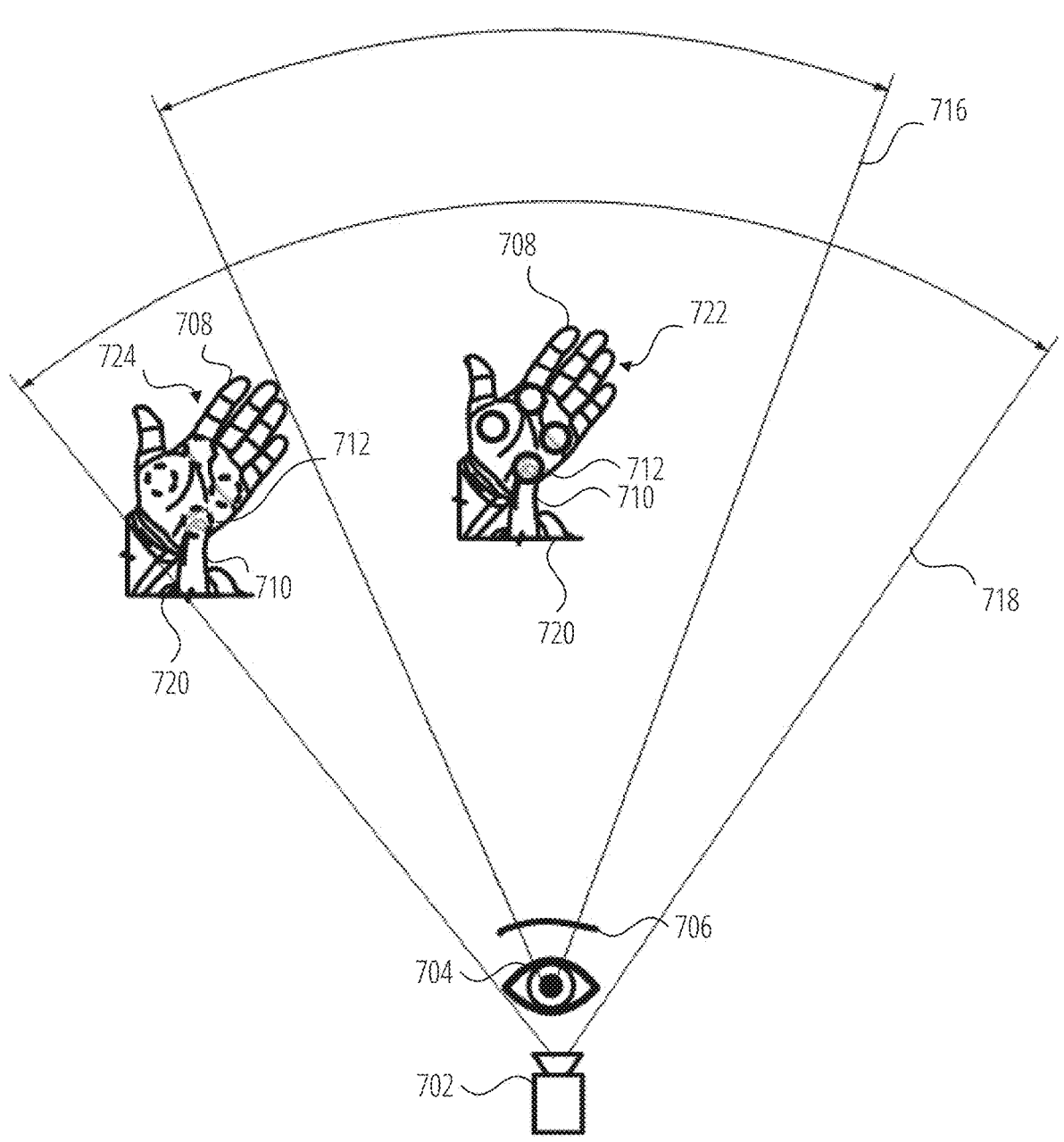
FIG. 7 illustrates a proprioceptive XR user interface, according to some examples.

FIG. 7 illustrates a proprioceptive XR user interface, according to some examples. An XR system, such as XR system 510 of FIG. 5A uses a proprioceptive XR user interface to provide a proprioceptive user input modality to a user of the XR system.

An XR system uses one or more optical elements, such as optical element 706, to generate images of interactive virtual objects of a proprioceptive XR user interface, such as interactive virtual object 712, as described more fully in reference to FIG. 1A and FIG. 1B. The proprioceptive XR user interface can be located on a first hand 708 of a user and the user can use a digit 710 of a second hand 720 to interact the interactive virtual object 712. These interactive virtual objects are rendered by the XR system using the optical element 706 when the first hand 708 is positioned at a location 722 within an optical element field of view 716 of the optical element 706. When the first hand 708 is within the optical element field of view 716, a user's eye 704 can see the interactive virtual object 712 as displayed by the optical element 706. In addition, a tracking sensor 702 can capture tracking data of the first hand 708 and the digit 710 of the second hand 720 as the user interacts with interactive virtual object 712 as described more fully in reference to FIGS. 6A to 6E. The tracking sensor 702 can do so whenever the user positions their first hand 576 at a location 722 within a sensor field of view 718. When the first hand 708 is positioned at a location 724 outside of the optical element field of view 716 but within the sensor field of view 718, the user can still interact with the interactive virtual object 712 proprioceptively even though the optical element 706 is incapable of rendering the interactive virtual object 712 when the first hand 708 is positioned at a location 724 outside of the optical element field of view 716. This allows the XR system to provide a proprioceptive user input modality to a user outside of the optical element field of view 716.

In some examples, a proprioceptive XR user interface can be provided to a user inside the peripheral field of view of the user and outside of an optical element field of view of an optical element of an XR system providing the proprioceptive XR user interface.

In some examples, a proprioceptive XR user interface can be provided to a user outside the peripheral field of view of the user and outside of an optical element field of view of an optical element of an XR system providing the proprioceptive XR user interface.

In some examples, a tracking sensor can be angled such that an optical axis of the tracking sensor is below an optical axis of an optical element used to display images of an interactive virtual object to a user. This allows a user to hold their hands below their line of sight when viewing or interacting with virtual objects provided by an XR system.

In some examples, a tracking sensor can be angled such that an optical axis of the tracking sensor is to one side of an optical axis of an optical element used to display images of an interactive virtual object to a user. This allows a user to hold their hands outside and to the side of their line of sight when viewing or interacting with virtual objects provided by an XR system.

In some examples, a tracking sensor can be angled such that an optical axis of the tracking sensor is above an optical axis of an optical element used to display images of an interactive virtual object to a user. This allows a user to hold their hands above their line of sight when viewing or interacting with virtual objects provided by an XR system.

Machine-Learning Pipeline

FIG. 8B is a flowchart depicting a machine-learning pipeline 816, according to some examples. The machine-learning pipeline 816 can be used to generate a trained machine-learning model 818 such as, but not limited to ROI detector model 509 of FIG. 5A, tracking model 544 of FIG. 5A, 3D coordinate generator model 546 of FIG. FIG. 5A, cropping model 564 of FIG. 5A, hand touch model 562 of FIG. 5A, and the like, to perform operations associated with determining user inputs into an XR system, such as XR system 510 of FIG. 5A.

Machine learning can involve using computer algorithms to automatically learn patterns and relationships in data, potentially without the need for explicit programming. Machine learning algorithms can be divided into three main categories: supervised learning, unsupervised learning, and reinforcement learning.

Supervised learning involves training a model using labeled data to predict an output for new, unseen inputs. Examples of supervised learning algorithms include linear regression, decision trees, and neural networks.

Unsupervised learning involves training a model on unlabeled data to find hidden patterns and relationships in the data. Examples of unsupervised learning algorithms include clustering, principal component analysis, and generative models like autoencoders.

Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that can be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks, which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting can be used in various machine learning applications.

Three example types of problems in machine learning are classification problems, regression problems, and generation problems. Classification problems, also referred to as categorization problems, aim at classifying items into one of several category values (for example, is this object an apple or an orange?). Regression algorithms aim at quantifying some items (for example, by providing a value that is a real number). Generation algorithms aim at producing new examples that are similar to examples provided for training. For instance, a text generation algorithm is trained on many text documents and is configured to generate new coherent text with similar statistical properties as the training data.

Generating a trained machine-learning model 818 can include multiple phases that form part of the machine-learning pipeline 816, including for example the following phases illustrated in FIG. 8A:

Data collection and preprocessing 802: This phase can include acquiring and cleaning data to ensure that it is suitable for use in the machine learning model. This phase can also include removing duplicates, handling missing values, and converting data into a suitable format.

Feature engineering 804: This phase can include selecting and transforming the training data 822 to create features that are useful for predicting the target variable. Feature engineering can include (1) receiving features 824 (e.g., as structured or labeled data in supervised learning) and/or (2) identifying features 824 (e.g., unstructured or unlabeled data for unsupervised learning) in training data 822.

Model selection and training 806: This phase can include selecting an appropriate machine learning algorithm and training it on the preprocessed data. This phase can further involve splitting the data into training and testing sets, using cross-validation to evaluate the model, and tuning hyperparameters to improve performance.

Model evaluation 808: This phase can include evaluating the performance of a trained model (e.g., the trained machine-learning model 818) on a separate testing dataset. This phase can help determine if the model is overfitting or underfitting and determine whether the model is suitable for deployment.

Prediction 810: This phase involves using a trained model (e.g., trained machine-learning model 818) to generate predictions on new, unseen data.

Validation, refinement or retraining 812: This phase can include updating a model based on feedback generated from the prediction phase, such as new data or user feedback.

Deployment 814: This phase can include integrating the trained model (e.g., the trained machine-learning model 818) into a more extensive system or application, such as a web service, mobile app, or IoT device. This phase can involve setting up APIs, building a user interface, and ensuring that the model is scalable and can handle large volumes of data.

FIG. 8B illustrates further details of two example phases, namely a training phase 820 (e.g., part of the model selection and trainings 806) and a prediction phase 826 (part of prediction 810). Prior to the training phase 820, feature engineering 804 is used to identify features 824. This can include identifying informative, discriminating, and independent features for effectively operating the trained machine-learning model 818 in pattern recognition, classification, and regression. In some examples, the training data 822 includes labeled data, known for pre-identified features 824 and one or more outcomes. Each of the features 824 can be a variable or attribute, such as an individual measurable property of a process, article, system, or phenomenon represented by a data set (e.g., the training data 822). Features 824 can also be of different types, such as numeric features, strings, and graphs, and can include one or more of content 828, concepts 830, attributes 832, historical data 834, and/or user data 836, merely for example.

In training phase 820, the machine-learning pipeline 816 uses the training data 822 to find correlations among the features 824 that affect a predicted outcome or prediction/inference data 838.

With the training data 822 and the identified features 824, the trained machine-learning model 818 is trained during the training phase 820 during machine-learning program training 840. The machine-learning program training 840 appraises values of the features 824 as they correlate to the training data 822. The result of the training is the trained machine-learning model 818 (e.g., a trained or learned model).

Further, the training phase 820 can involve machine learning, in which the training data 822 is structured (e.g., labeled during preprocessing operations). The trained machine-learning model 818 implements a neural network 842 capable of performing, for example, classification and clustering operations. In other examples, the training phase 820 can involve deep learning, in which the training data 822 is unstructured, and the trained machine-learning model 818 implements a deep neural network 842 that can perform both feature extraction and classification/clustering operations.

In some examples, a neural network 842 can be generated during the training phase 820, and implemented within the trained machine-learning model 818. The neural network

842 includes a hierarchical (e.g., layered) organization of neurons, with each layer consisting of multiple neurons or nodes. Neurons in the input layer receive the input data, while neurons in the output layer produce the final output of the network. Between the input and output layers, there can be one or more hidden layers, each consisting of multiple neurons.

Each neuron in the neural network 842 operationally computes a function, such as an activation function, which takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks can use different activation functions and learning algorithms, affecting their performance on different tasks. The layered organization of neurons and the use of activation functions and weights enable neural networks to model complex relationships between inputs and outputs, and to generalize to new inputs that were not seen during training.

In some examples, the neural network 842 can also be one of several different types of neural networks, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 820, a validation phase can be performed on a separate dataset known as the validation dataset. The validation dataset is used to tune the hyperparameters of a model, such as the learning rate and the regularization parameter. The hyperparameters are adjusted to improve the model's performance on the validation dataset.

Once a model is fully trained and validated, in a testing phase, the model can be tested on a new dataset. The testing dataset is used to evaluate the model's performance and ensure that the model has not overfitted the training data.

In prediction phase 826, the trained machine-learning model 818 uses the features 824 for analyzing inference data 844 to generate inferences, outcomes, or predictions, as examples of a prediction/inference data 838. For example, during prediction phase 826, the trained machine-learning model 818 generates an output. Inference data 844 is provided as an input to the trained machine-learning model 818, and the trained machine-learning model 818 generates the prediction/inference data 838 as output, responsive to receipt of the inference data 844.

In some examples, the trained machine-learning model 818 can be a generative AI model. Generative AI is a term that can refer to any type of artificial intelligence that can create new content from training data 822. For example, generative AI can produce text, images, video, audio, code, or synthetic data similar to the original data but not identical. In cases where the trained machine-learning model 818 is a generative AI, inference data 844 can include text, audio, image, video, numeric, or media content prompts and the output prediction/inference data 838 can include text, images, video, audio, code, or synthetic data.

Some of the techniques that can be used in generative AI are:

Convolutional Neural Networks (CNNs): CNNs can be used for image recognition and computer vision tasks. CNNs can, for example, be designed to extract features from images by using filters or kernels that scan the input image and highlight important patterns.

Recurrent Neural Networks (RNNs): RNNs can be used for processing sequential data, such as speech, text, and time series data, for example. RNNs employ feedback loops that allow them to capture temporal dependencies and remember past inputs.

Generative adversarial networks (GANs): GANs can include two neural networks: a generator and a discriminator. The generator network attempts to create realistic content that can "fool" the discriminator network, while the discriminator network attempts to distinguish between real and fake content. The generator and discriminator networks compete with each other and improve over time.

Variational autoencoders (VAEs): VAEs can encode input data into a latent space (e.g., a compressed representation) and then decode it back into output data. The latent space can be manipulated to generate new variations of the output data. VAEs can use self-attention mechanisms to process input data, allowing them to handle long text sequences and capture complex dependencies.

Transformer models: Transformer models can use attention mechanisms to learn the relationships between different parts of input data (such as words or pixels) and generate output data based on these relationships. Transformer models can handle sequential data, such as text or speech, as well as non-sequential data, such as images or code.

FIG. 9 illustrates an example hand touch model training method 900, according to some examples. A machine-learning pipeline 816 of FIG. 8A uses the hand touch model training method 900 to train a hand touch model, such as hand touch model 562 of FIG. 5A, used in an XR system, such as XR system 510 of FIG. 5A. Although the example hand touch model training method 900 depicts a particular sequence of operations, the sequence may be altered without departing from the scope of the present disclosure. For example, some of the operations depicted may be performed in parallel or in a different sequence that does not materially affect the function of the hand touch model training method 900. In other examples, different components of an example device or system that implements the hand touch model training method 900 may perform functions at substantially the same time or in a specific sequence.

In operation 902, an XR system being used by a user captures a plurality of image sequences of a palmar surface or hand dorsal surface of a first hand of the use and a digit of a second hand of the user. In some examples, this process involves recording various hand movements and positions to gather comprehensive visual data. The captured image sequences include different scenarios such as the digit hovering over the palmar surface or hand dorsal surface without touching the palmar surface or hand dorsal surface, the digit maintaining a first or regular pressure contact with the palm, and the digit applying a second or extreme pressure to the palmar surface or hand dorsal surface where the second pressure is greater than the first pressure. These varied conditions are useful for training the machine-learning model to accurately recognize and interpret different touch interactions and pressure levels. The data collected is then used to enhance a hand touch model's ability to differentiate between touch states based on visual cues such as shadows and skin deformations, which are useful for determining precise touch interaction detection in XR systems.

In some examples, the image sequences include a (first) image sequence with the digit hovering over the palmar surface or hand dorsal surface without touching the palmar surface or hand dorsal surface. This image sequence includes the digit of one hand hovering over the palmar surface or hand dorsal surface of the other hand without making contact, which helps train the hand touch model to recognize non-contact gestures.

In some examples, the image sequences include a (second) image sequence with the digit maintaining a (first) regular pressure contact with the palmar surface or hand dorsal surface in a hand touch where the (first) regular pressure does not exceed a (first) specified threshold pressure value. This image sequence captures the digit maintaining regular pressure contact with the palm, used to train the hand touch model to recognize standard touch interactions.

In some examples, the image sequences include a (third) image sequence with the digit applying a (second) extreme pressure to the palmar surface or hand dorsal surface in a hand touch where the (second) extreme pressure exceeds a (second) specified threshold pressure value. In some examples, the (second) specified threshold value of the extreme pressure hand touch exceeds the (first) specified threshold value of the regular pressure hand touch. The third image sequence where the digit applies extreme pressure to the palm, allows training the hand touch model to differentiate between varying degrees of pressure. This capability is useful in applications featuring nuanced control of virtual environments or interfaces, where precise touch differentiation enhances user experience and system responsiveness.

In some examples, a test subject used to capture the training data is instructed to touch a palmar surface or hand dorsal surface of their left hand with a digit of their right hand. In other examples, the test subject is instructed to touch a palmar surface or hand dorsal surface of their right hand with a digit of their left hand.

In some examples, a test subject used to collect the training data is instructed to touch specific fleshy portions of a palmar surface formed by the muscles of their hand during the collection of the training data. For example, the subject is instructed to touch the portions of their palm such as, but not limited to the thenar eminence at the thumb base, the hypothenar eminence at the little finger base, the interdigital spaces between fingers, and the midpalmar space, and the like.

In some examples, a test subject used to capture the training data is instructed to touch a palmar surface or hand dorsal surface and, while keeping pressure on the palmar surface or hand dorsal surface, move the digit touching the palmar surface or hand dorsal surface across the palmar surface or hand dorsal surface in one or more directions.

In some examples, a test subject used to capture the testing data is instructed to hold one of their hands in various positions as they touch a palmar surface or hand dorsal surface of that hand with their other hand.

In some examples, the training data is captured under two or more different lighting conditions.

In operation 904, the machine-learning pipeline 816 processes the captured video sequences to generate cropped images focused on a palmar surface or hand dorsal surface and a digit touching the palmar surface or hand dorsal surface. In some examples, an image encoder component of the hand touch model utilizes a convolutional neural network architecture designed for efficient performance on mobile and embedded devices with limited computational resources. architecture. The image encoder component is designed to process input images that are 128×128 pixels in either color or grayscale format. In some examples, the cropping of the images is centered around a tip of a digit being used by a user to make a hand touch, incorporating a margin of padding. This specific cropping technique allows the model to discern finer visual details, such as subtle shadows and depth cues. These details enhance the ability of the hand touch model to learn and accurately interpret various touch interactions within an XR environment.

In operation 906, machine-learning pipeline 816 annotates the cropped images with bounding boxes using a hand tracking process to isolate an area of a palmar surface or hand dorsal surface in the cropped images. In some examples, this annotation is performed using a hand-tracking process specifically designed to isolate the area within the cropped images. This step is useful for focusing the analysis and subsequent machine learning training on the regions of interest such as an area where hand touch interactions occur. By isolating this area, the hand touch model can more effectively learn and recognize the nuances of different touch pressures and angles, enhancing the hand touch model's ability to respond accurately to user inputs in real-time applications.

In operation 908, the machine-learning pipeline 816 loads the annotated cropped images into a data loader configured to handle parallel data loading and image augmentation. In some examples, this data loader is specifically configured to manage parallel data loading and image augmentation. This configuration is useful for efficiently handling large volumes of image data, providing for the machine learning model to be trained on a diverse set of images. The parallel loading capability speeds up the process, while the image augmentation feature introduces variations in the training data, which helps in developing a robust model capable of accurately interpreting various real-world scenarios. This step improves the ability of the hand touch model to generalize from the training data to actual application environments, thereby improving performance and reliability in practical use cases.

In operation 910, the machine-learning pipeline 816 trains a hand touch model on the loaded images. In some examples, the machine-learning pipeline 816 treats the task as a regression problem, where the hand touch model is designed to output a scaler hand pressure level value of a hand touch pressure level that indicates a level of pressure applied by a user to a palmar surface or hand dorsal surface during a hand touch. In some examples, scalar values are defined as follows: 0.0 represents no touch or hovering, 1.0 indicates touch with normal pressure, and 2.0 signifies touch with extreme pressure. This approach allows the hand touch model to quantitatively assess the degree of pressure applied in each hand touch interaction, which is useful for applications requiring sensitive touch differentiation. By training the hand touch model to interpret these scalar values, the XR system 510 can more accurately respond to user inputs, enhancing an interactive experience in applications user interfaces where variable hand touch control is useful.

In some examples, an XR system uses a scaler hand pressure level value of a hand touch pressure level to provide haptic feedback to a user. For example, the user can be instructed to bring a digit of the user close to an interactive virtual object associated with a palmar surface or hand dorsal surface of the user without touching the palmar surface or hand dorsal surface and the user can then sense that they are not touching the palmar surface or hand dorsal surface yet be aware that their digit is close to the palmar surface or hand dorsal surface. The user can be instructed to apply a light pressure to the palmar surface or hand dorsal surface and the user can sense when their digit is lightly touching the palmar surface or hand dorsal surface. The user can be instructed to press their digit firmly against the palmar surface or hand dorsal surface and the can sense when they are applying a heavier pressure to the palmar surface or hand dorsal surface using their digit. The XR system can then determine the scaler hand pressure level value using the hand touch model and use the scaler hand pressure level value as a variable input parameter to an application being executed by the XR system.

In operation 912, the machine-learning pipeline 816 trains the hand touch model to interpolate between the defined pressure values. In some examples, the machine-learning pipeline 816 trains the hand touch model to interpolate between the defined pressure values. This training enables the hand touch model to detect intermediate pressure levels during inference. By learning to interpolate, the hand touch model can accurately predict not just the discrete states of no touch, normal pressure, and extreme pressure, but also the nuanced variations in pressure that occur between these states. This capability is useful for applications requiring fine-grained control over touch interactions where the ability to detect subtle differences in hand touch pressure can significantly enhance user experience and system responsiveness.

In operation 914, the hand touch model is deployed in the XR system 510 allowing the XR system 510 to detect and quantify hand touch interactions based on visual cues from images captured by the XR system 510 of a palmar surface or hand dorsal surface and digit of a user as more fully described in reference to FIG. 5A.

In some examples, a hand touch model is retrained using a set of re-training data captured as the user responds to one or more prompts from an XR system.

In some examples, a hand touch model is trained on a dataset including images of hand touches under two or more lighting conditions. This training approach is useful for enhancing the model's ability to accurately recognize hand touches across diverse environments and lighting scenarios. By training the hand touch model to various lighting conditions, a hand touch detection process remains effective and reliable, regardless of changes in ambient light. This capability is useful for maintaining consistent user interaction experiences in both indoor and outdoor settings, or during transitions between different lighting environments within XR applications.

In some examples, body portion image data is captured that includes recorded positions, orientations, and gestures of portions of the body of the user such as, but not limited to, portions of a wrist, a lower arm, an upper arm, the chest, and the like, of the user. One or more cropping models and hand touch models can be trained using the body portion image data using the body portion image data in a similar methodology used to train a hand touch model. These models can be used tracking data to generate an XR user interface including one or more interactive virtual objects that are associated with those portions of the user's body using the methodologies described herein. The XR system can use one or more touch detection pipelines including the one or more cropping models and the one or more hand touch models trained to detect touches by the user on those portions of the user's body in a similar manner as detecting hand touches on a palmar surface or hand dorsal surface of a hand of the user as described herein.

Figure 10:
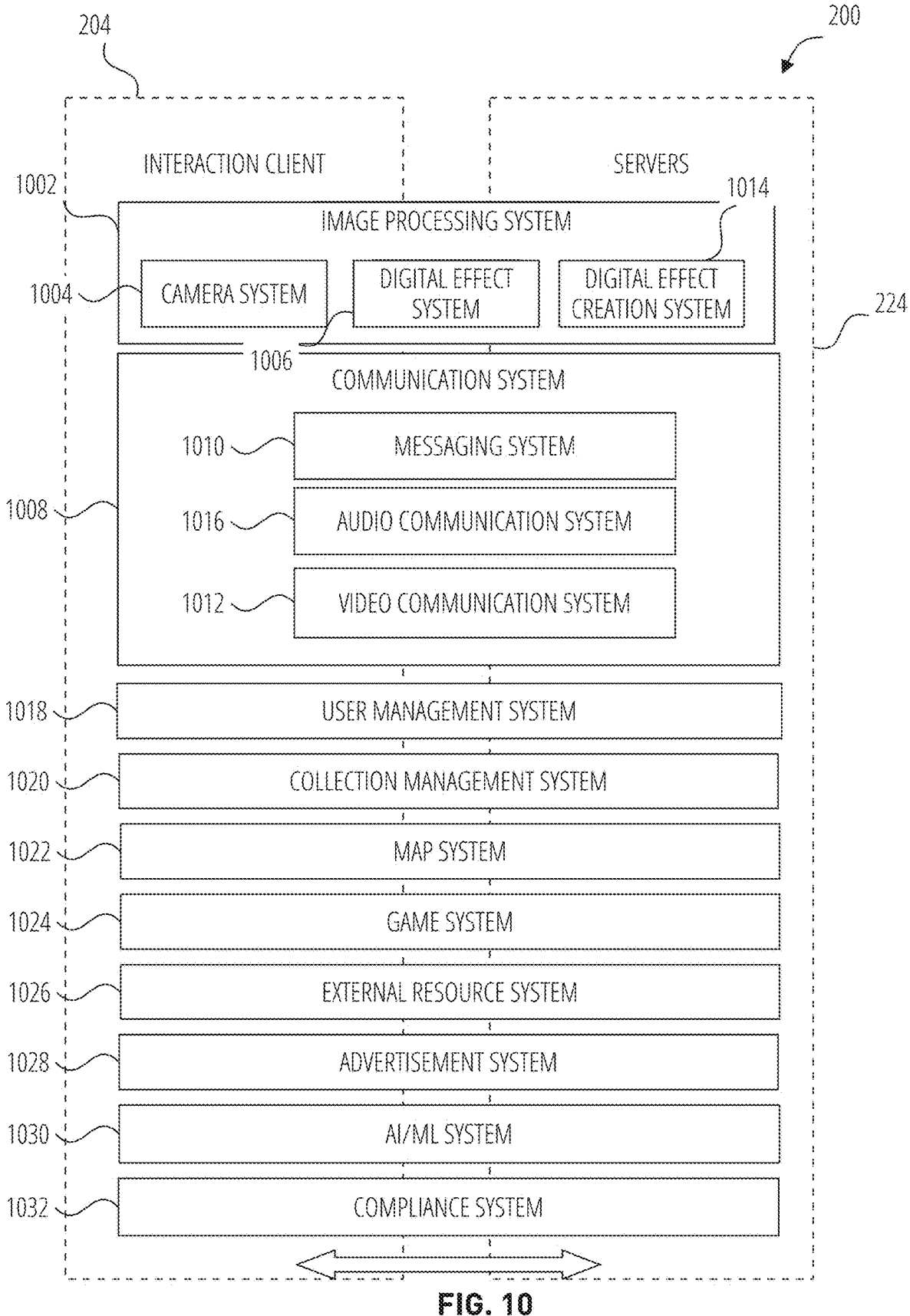
FIG. 10 is a diagrammatic representation of a digital interaction system that has both client-side and server-side functionality, according to some examples.

FIG. 10 is a block diagram illustrating further details regarding the digital interaction system 200, according to some examples. Specifically, the digital interaction system 200 is shown to comprise the interaction client 204 and the servers 224. The digital interaction system 200 embodies multiple subsystems, which are supported on the client-side by the interaction client 204 and on the server-side by the servers 224. In some examples, these subsystems are implemented as microservices. A microservice subsystem (e.g., a microservice application) can have components that enable it to operate independently and communicate with other services. Example components of microservice subsystem can include:

Function logic: The function logic implements the functionality of the microservice subsystem, representing a specific capability or function that the microservice provides.

API interface: Microservices can communicate with each other components through well-defined APIs or interfaces, using lightweight protocols such as REST or messaging. The API interface defines the inputs and outputs of the microservice subsystem and how it interacts with other microservice subsystems of the digital interaction system 200.

Data storage: A microservice subsystem can be responsible for its own data storage, which can be in the form of a database, cache, or other storage mechanism (e.g., using the database server 226 and database 228). This enables a microservice subsystem to operate independently of other microservices of the digital interaction system 200.

Service discovery: Microservice subsystems can find and communicate with other microservice subsystems of the digital interaction system 200. Service discovery mechanisms enable microservice subsystems to locate and communicate with other microservice subsystems in a scalable and efficient way.

Monitoring and logging: Microservice subsystems can need to be monitored and logged to ensure availability and performance. Monitoring and logging mechanisms enable the tracking of health and performance of a microservice subsystem.

In some examples, the digital interaction system 200 can employ a monolithic architecture, a service-oriented architecture (SOA), a function-as-a-service (FaaS) architecture, or a modular architecture:

An image processing system 1002 provides various functions that enable a user to capture and modify (e.g., augment, annotate or otherwise edit) media content associated with a message.

A camera system 1004 includes control software (e.g., in a camera application) that interacts with and controls hardware camera hardware (e.g., directly or via operating system controls) of the user system 202 to modify real-time images captured and displayed via the interaction client 204.

The digital effect system 1006 provides functions related to the generation and publishing of digital effects (e.g., media overlays) for images captured in real-time by cameras of the user system 202 or retrieved from memory of the user system 202. For example, the digital effect system 1006 operatively selects, presents, and displays digital effects (e.g., media overlays such as image filters or modifications) to the interaction client 204 for the modification of real-time images received via the camera system 1004 or stored images retrieved from memory 302 of a user system 202. These digital effects are selected by the digital effect system 1006 and presented to a user of an interaction client 204, based on a number of inputs and data, such as for example:

Geolocation of the user system 202; and

Entity relationship information of the user of the user system 202.

Digital effects can include audio and visual content and visual effects. Examples of audio and visual content include pictures, texts, logos, animations, and sound effects. Examples of visual effects include color overlays and media overlays. The audio and visual content or the visual effects can be applied to a media content item (e.g., a photo or video) at user system 202 for communication in a message, or applied to video content, such as a video content stream or feed transmitted from an interaction client 204. As such, the image processing system 1002 can interact with, and support, the various subsystems of the communication system 1008, such as the messaging system 1010 and the video communication system 1012.

A media overlay can include text or image data that can be overlaid on top of a photograph taken by the user system 202 or a video stream produced by the user system 202. In some examples, the media overlay can be a location overlay (e.g., Venice beach), a name of a live event, or a name of a merchant overlay (e.g., Beach Coffee House). In further examples, the image processing system 1002 uses the geolocation of the user system 202 to identify a media overlay that includes the name of a merchant at the geolocation of the user system 202. The media overlay can include other indicia associated with the merchant. The media overlays can be stored in the databases 228 and accessed through the database server 226.

The image processing system 1002 provides a user-based publication platform that enables users to select a geolocation on a map and upload content associated with the selected geolocation. The user can also specify circumstances under which a particular media overlay should be offered to other users. The image processing system 1002 generates a media overlay that includes the uploaded content and associates the uploaded content with the selected geolocation.

The digital effect creation system 1014 supports augmented reality developer platforms and includes an application for content creators (e.g., artists and developers) to create and publish digital effects (e.g., augmented reality experiences) of the interaction client 204. The digital effect creation system 1014 provides a library of built-in features and tools to content creators including, for example custom shaders, tracking technology, and templates.

In some examples, the digital effect creation system 1014 provides a merchant-based publication platform that enables merchants to select a particular digital effect associated with a geolocation via a bidding process. For example, the digital effect creation system 1014 associates a media overlay of the highest bidding merchant with a corresponding geolocation for a predefined amount of time.

A communication system 1008 is responsible for enabling and processing multiple forms of communication and interaction within the digital interaction system 200 and includes a messaging system 1010, an audio communication system 1016, and a video communication system 1012. The messaging system 1010 is responsible, in some examples, for enforcing the temporary or time-limited access to content by the interaction clients 204. The messaging system 1010 incorporates multiple timers that, based on duration and display parameters associated with a message or collection of messages (e.g., a narrative), selectively enable access (e.g., for presentation and display) to messages and associated content via the interaction client 204. The audio communication system 1016 enables and supports audio communications (e.g., real-time audio chat) between multiple interaction clients 204. Similarly, the video communication system 1012 enables and supports video communications (e.g., real-time video chat) between multiple interaction clients 204.

A user management system 1018 is operationally responsible for the management of user data and profiles, and maintains entity information (e.g., stored in entity tables 1106, entity graphs 1108 and profile data 1102) regarding users and relationships between users of the digital interaction system 200.

A collection management system 1020 is operationally responsible for managing sets or collections of media (e.g., collections of text, image video, and audio data). A collection of content (e.g., messages, including images, video, text, and audio) can be organized into an "event gallery" or an "event collection." Such a collection can be made available for a specified time period, such as the duration of an event to which the content relates. For example, content relating to a music concert can be made available as a "concert collection" for the duration of that music concert. The collection management system 1020 can also be responsible for publishing an icon that provides notification of a particular collection to the user interface of the interaction client 204. The collection management system 1020 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 1020 employs machine vision (or image recognition technology) and content rules to curate a content collection automatically. In certain examples, compensation can be paid to a user to include user-generated content into a collection. In such cases, the collection management system 1020 operates to automatically make payments to such users to use their content.

A map system 1022 provides various geographic location (e.g., geolocation) functions and supports the presentation of map-based media content and messages by the interaction client 204. For example, the map system 1022 enables the display of user icons or avatars (e.g., stored in profile data 1102) on a map to indicate a current or past location of "friends" of a user, as well as media content (e.g., collections of messages including photographs and videos) generated by such friends, within the context of a map. For example, a message posted by a user to the digital interaction system 200 from a specific geographic location can be displayed within the context of a map at that particular location to "friends" of a specific user on a map interface of the interaction client 204. A user can furthermore share his or her location and status information (e.g., using an appropriate status avatar) with other users of the digital interaction system 200 via the interaction client 204, with this location and status information being similarly displayed within the context of a map interface of the interaction client 204 to selected users.

A game system 1024 provides various gaming functions within the context of the interaction client 204. The interaction client 204 provides a game interface providing a list of available games that can be launched by a user within the context of the interaction client 204 and played with other users of the digital interaction system 200. The digital interaction system 200 further enables a particular user to invite other users to participate in the play of a specific game by issuing invitations to such other users from the interaction client 204. The interaction client 204 also supports audio, video, and text messaging (e.g., chats) within the context of gameplay, provides a leaderboard for the games, and supports the provision of in-game rewards (e.g., coins and items).

An external resource system 1026 provides an interface for the interaction client 204 to communicate with remote servers (e.g., third-party servers 212) to launch or access external resources, i.e., applications or applets. Each third-party server 212 hosts, for example, a markup language (e.g., HTML5) based application or a small-scale version of an application (e.g., game, utility, payment, or ride-sharing application). The interaction client 204 can launch a web-based resource (e.g., application) by accessing the HTML5 file from the third-party servers 212 associated with the web-based resource. Applications hosted by third-party servers 212 are programmed in JavaScript leveraging a Software Development Kit (SDK) provided by the servers 224. The SDK includes Application Programming Interfaces (APIs) with functions that can be called or invoked by the web-based application. The servers 224 host a JavaScript library that provides a given external resource access to specific user data of the interaction client 204. HTML5 is an example of technology for programming games, but applications and resources programmed based on other technologies can be used.

To integrate the functions of the SDK into the web-based resource, the SDK is downloaded by the third-party server 212 from the servers 224 or is otherwise received by the third-party server 212. Once downloaded or received, the SDK is included as part of the application code of a web-based external resource. The code of the web-based resource can then call or invoke certain functions of the SDK to integrate features of the interaction client 204 into the web-based resource.

The SDK stored on the server system 210 effectively provides the bridge between an external resource (e.g., applications 206 or applets) and the interaction client 204. This gives the user a seamless experience of communicating with other users on the interaction client 204 while also preserving the look and feel of the interaction client 204. To bridge communications between an external resource and an interaction client 204, the SDK facilitates communication between third-party servers 212 and the interaction client 204. A bridge script running on a user system 202 establishes two one-way communication channels between an external resource and the interaction client 204. Messages are sent between the external resource and the interaction client 204 via these communication channels asynchronously. Each SDK function invocation is sent as a message and callback. Each SDK function is implemented by constructing a unique callback identifier and sending a message with that callback identifier.

By using the SDK, not all information from the interaction client 204 is shared with third-party servers 212. The SDK limits which information is shared based on the needs of the external resource. Each third-party server 212 provides an HTML5 file corresponding to the web-based external resource to servers 224. The servers 224 can add a visual representation (such as a box art or other graphic) of the web-based external resource in the interaction client 204. Once the user selects the visual representation or instructs the interaction client 204 through a GUI of the interaction client 204 to access features of the web-based external resource, the interaction client 204 obtains the HTML5 file and instantiates the resources to access the features of the web-based external resource.

The interaction client 204 presents a graphical user interface (e.g., a landing page or title screen) for an external resource. During, before, or after presenting the landing page or title screen, the interaction client 204 determines whether the launched external resource has been previously authorized to access user data of the interaction client 204. In response to determining that the launched external resource has been previously authorized to access user data of the interaction client 204, the interaction client 204 presents another graphical user interface of the external resource that includes functions and features of the external resource. In response to determining that the launched external resource has not been previously authorized to access user data of the interaction client 204, after a threshold period of time (e.g., 3 seconds) of displaying the landing page or title screen of the external resource, the interaction client 204 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 204 adds the external resource to a list of authorized external resources and allows the external resource to access user data from the interaction client 204. The external resource is authorized by the interaction client 204 to access the user data under an OAuth 2 framework.

The interaction client 204 controls the type of user data that is shared with external resources based on the type of external resource being authorized. For example, external resources that include full-scale applications (e.g., an application 206) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 1028 operationally enables the purchasing of advertisements by third parties for presentation to end-users via the interaction clients 204 and handles the delivery and presentation of these advertisements.

An artificial intelligence and machine learning system 1030 provides a variety of services to different subsystems within the digital interaction system 200. For example, the artificial intelligence and machine learning system 1030 operates with the image processing system 1002 and the camera system 1004 to analyze images and extract information such as objects, text, or faces. This information can then be used by the image processing system 1002 to enhance, filter, or manipulate images. The artificial intelligence and machine learning system 1030 can be used by the digital effect system 1006 to generate modified content and augmented reality experiences, such as adding virtual objects or animations to real-world images. The communication system 1008 and messaging system 1010 can use the artificial intelligence and machine learning system 1030 to analyze communication patterns and provide insights into how users interact with each other and provide intelligent message classification and tagging, such as categorizing messages based on sentiment or topic. The artificial intelligence and machine learning system 1030 can also provide chatbot functionality to message interactions 220 between user systems 202 and between a user system 202 and the server system 210. The artificial intelligence and machine learning system 1030 can also work with the audio communication system 1016 to provide speech recognition and natural language processing capabilities, allowing users to interact with the digital interaction system 200 using voice commands.

A compliance system 1032 facilitates compliance by the digital interaction system 200 with data privacy and other regulations, including for example the California Consumer Privacy Act (CCPA), General Data Protection Regulation (GDPR), and Digital Services Act (DSA). The compliance system 1032 comprises several components that address data privacy, protection, and user rights, ensuring a secure environment for user data. A data collection and storage component securely handles user data, using encryption and enforcing data retention policies. A data access and processing component provides controlled access to user data, ensuring compliant data processing and maintaining an audit trail. A data subject rights management component facilitates user rights requests in accordance with privacy regulations, while the data breach detection and response component detects and responds to data breaches in a timely and compliant manner. The compliance system 1032 also incorporates opt-in/opt-out management and privacy controls across the digital interaction system 200, empowering users to manage their data preferences. The compliance system 1032 is designed to handle sensitive data by obtaining explicit consent, implementing strict access controls and in accordance with applicable laws.

Figure 11:
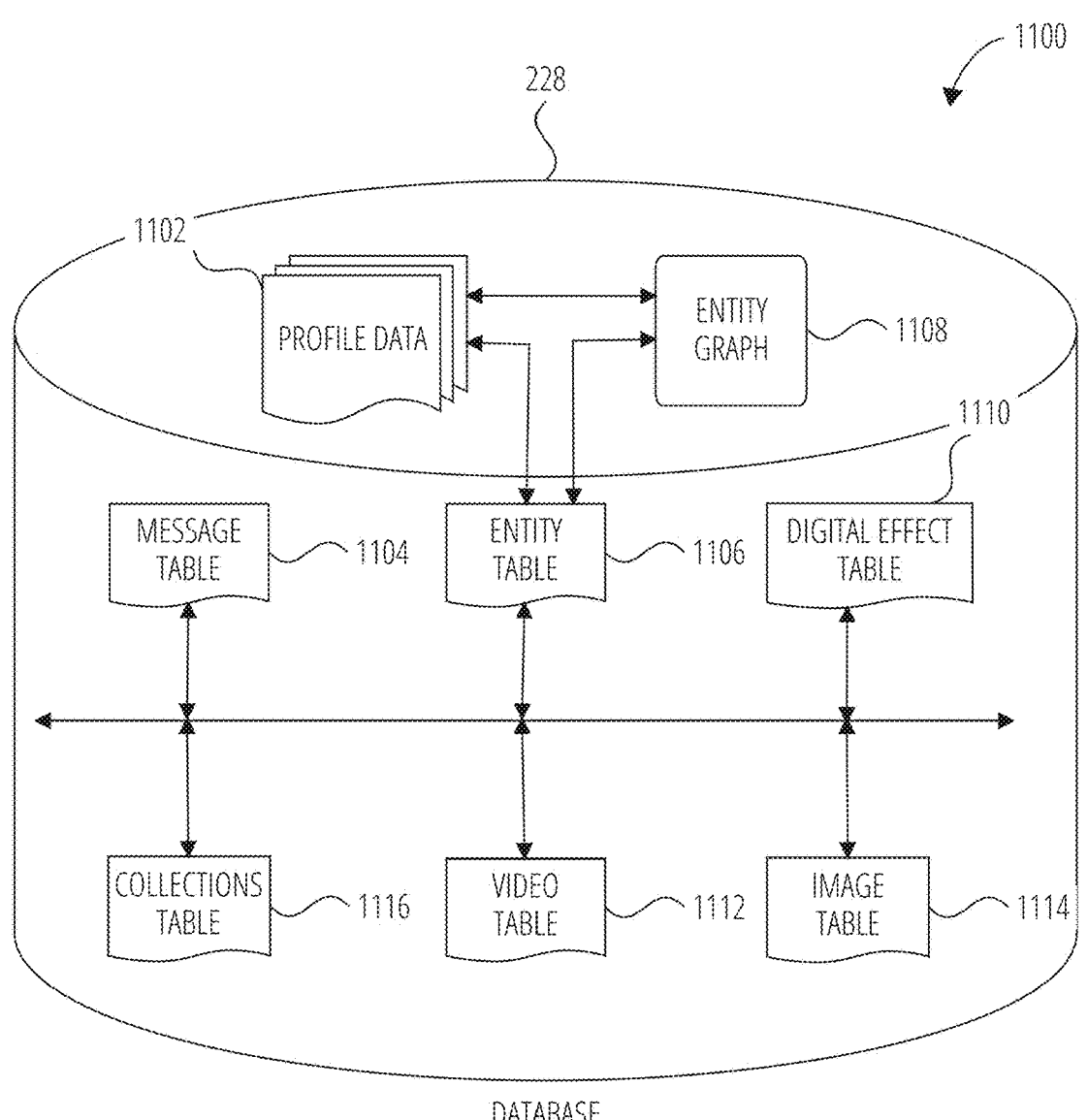
FIG. 11 is a diagrammatic representation of a data structure as maintained in a database, according to some examples.

FIG. 11 is a schematic diagram illustrating data structures 1100, which can be stored in the database 228 of the server system 210, according to certain examples. While the content of the database 228 is shown to comprise multiple tables, it will be appreciated that the data could be stored in other types of data structures (e.g., as an object-oriented database).

The database 228 includes message data stored within a message table 1104. This message data includes at least message sender data, message recipient (or receiver) data, and a payload. Further details regarding information that can be included in a message, and included within the message data stored in the message table 1104, are described below with reference to FIG. 11.

An entity table 1106 stores entity data, and is linked (e.g., referentially) to an entity graph 1108 and profile data 1102. Entities for which records are maintained within the entity table 1106 can include individuals, corporate entities, organizations, objects, places, events, and so forth. Regardless of entity type, any entity regarding which the server system 210 stores data can be a recognized entity. Each entity is provided with a unique identifier, as well as an entity type identifier (not shown).

The entity graph 1108 stores information regarding relationships and associations between entities. Such relationships can be social, professional (e.g., work at a common corporation or organization), interest-based, or activity-based, merely for example. Certain relationships between entities can be unidirectional, such as a subscription by an individual user to digital content of a commercial or publishing user (e.g., a newspaper or other digital media outlet, or a brand). Other relationships can be bidirectional, such as a "friend" relationship between individual users of the digital interaction system 200.

Certain permissions and relationships can be attached to each relationship, and to each direction of a relationship. For example, a bidirectional relationship (e.g., a friend relationship between individual users) can include authorization for the publication of digital content items between the individual users, but can impose certain restrictions or filters on the publication of such digital content items (e.g., based on content characteristics, location data or time of day data). Similarly, a subscription relationship between an individual user and a commercial user can impose different degrees of restrictions on the publication of digital content from the commercial user to the individual user, and can significantly restrict or block the publication of digital content from the individual user to the commercial user. A particular user, as an example of an entity, can record certain restrictions (e.g., by way of privacy settings) in a record for that entity within the entity table 1106. Such privacy settings can be applied to all types of relationships within the context of the digital interaction system 200, or can selectively be applied to certain types of relationships.

The profile data 1102 stores multiple types of profile data about a particular entity. The profile data 1102 can be selectively used and presented to other users of the digital interaction system 200 based on privacy settings specified by a particular entity. Where the entity is an individual, the profile data 1102 includes, for example, a username, telephone number, address, settings (e.g., notification and privacy settings), as well as a user-selected avatar representation (or collection of such avatar representations). A particular user can then selectively include one or more of these avatar representations within the content of messages communicated via the digital interaction system 200, and on map interfaces displayed by interaction clients 204 to other users. The collection of avatar representations can include "status avatars," which present a graphical representation of a status or activity that the user can select to communicate at a particular time.

Where the entity is a group, the profile data 1102 for the group can similarly include one or more avatar representations associated with the group, in addition to the group name, members, and various settings (e.g., notifications) for the relevant group.

The database 228 also stores digital effect data, such as overlays or filters, in a digital effect table 1110. The digital effect data is associated with and applied to videos (for which data is stored in a video table 1112) and images (for which data is stored in an image table 1114).

Filters, in some examples, are overlays that are displayed as overlaid on an image or video during presentation to a recipient user. Filters can be of various types, including user-selected filters from a set of filters presented to a sending user by the interaction client 204 when the sending user is composing a message. Other types of filters include geolocation filters (also known as geo-filters), which can be presented to a sending user based on geographic location. For example, geolocation filters specific to a neighborhood or special location can be presented within a user interface by the interaction client 204, based on geolocation information determined by a Global Positioning System (GPS) unit of the user system 202.

Another type of filter is a data filter, which can be selectively presented to a sending user by the interaction client 204 based on other inputs or information gathered by the user system 202 during the message creation process. Examples of data filters include current temperature at a specific location, a current speed at which a sending user is traveling, battery life for a user system 202, or the current time.

Other digital effect data that can be stored within the image table 1114 includes augmented reality content items (e.g., corresponding to augmented reality experiences). An augmented reality content item can be a real-time special effect and sound that can be added to an image or a video.

A collections table 1116 stores data regarding collections of messages and associated image, video, or audio data, which are compiled into a collection (e.g., a narrative or a gallery). The creation of a particular collection can be initiated by a particular user (e.g., each user for which a record is maintained in the entity table 1106). A user can create a "personal collection" in the form of a collection of content that has been created and sent/broadcast by that user. To this end, the user interface of the interaction client 204 can include an icon that is user-selectable to enable a sending user to add specific content to his or her personal narrative.

A collection can also constitute a "live collection," which is a collection of content from multiple users that is created manually, automatically, or using a combination of manual and automatic techniques. For example, a "live collection" can constitute a curated stream of user-submitted content from various locations and events. Users whose client devices have location services enabled and are at a common location event at a particular time can, for example, be presented with an option, via a user interface of the interaction client 204, to contribute content to a particular live collection. The live collection can be identified to the user by the interaction client 204, based on his or her location.

A further type of content collection is known as a "location collection," which enables a user whose user system 202 is located within a specific geographic location (e.g., on a college or university campus) to contribute to a particular collection. In some examples, a contribution to a location collection can employ a second degree of authentication to verify that the end-user belongs to a specific organization or other entity (e.g., is a student on the university campus).

As mentioned above, the video table 1112 stores video data that, in some examples, is associated with messages for which records are maintained within the message table 1104. Similarly, the image table 1114 stores image data associated with messages for which message data is stored in the entity table 1106. The entity table 1106 can associate various digital effects from the digital effect table 1110 with various images and videos stored in the image table 1114 and the video table 1112.

Figure 12:
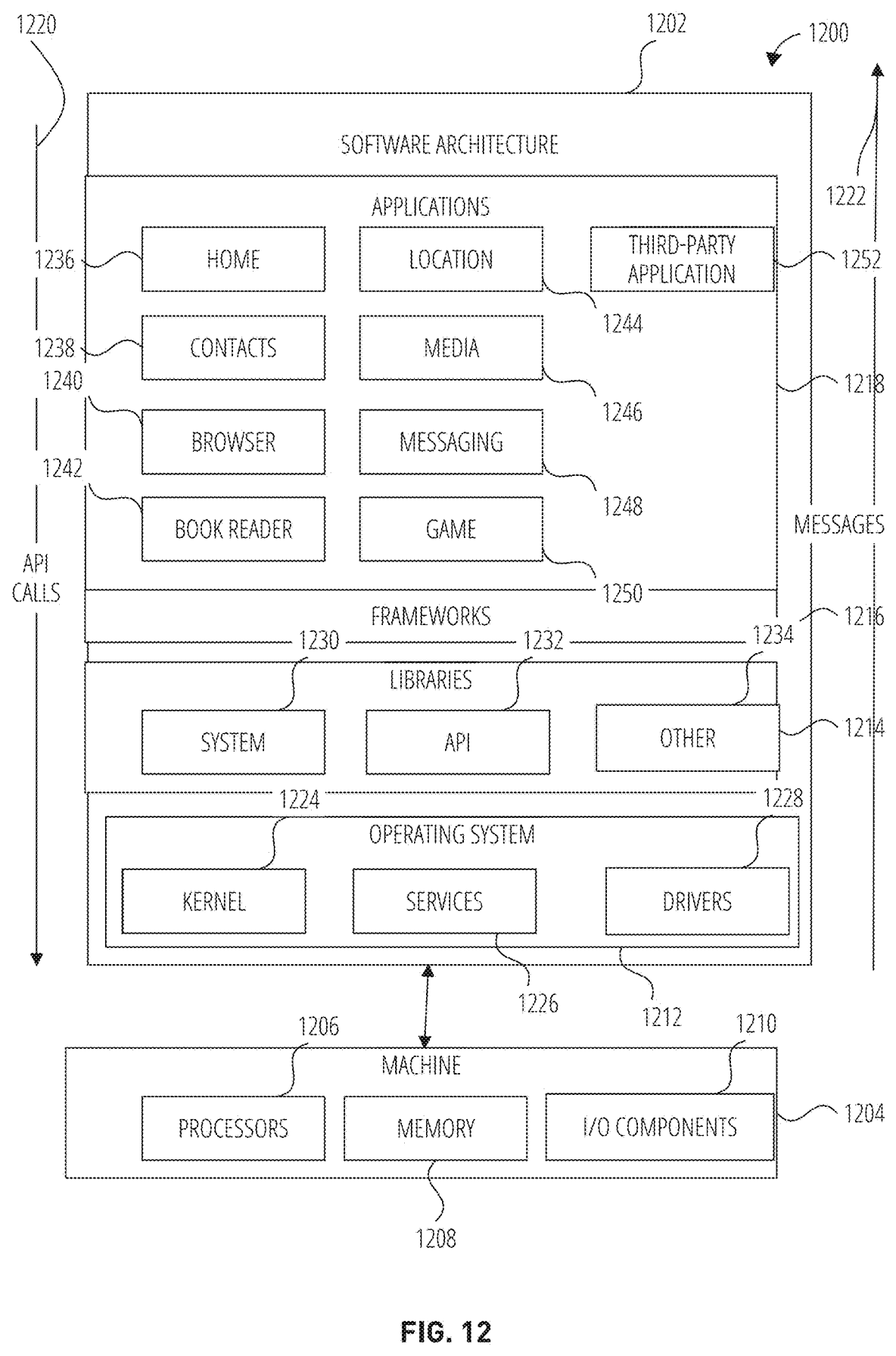

FIG. 12 is a block diagram 1200 illustrating a software architecture 1202, which can be installed on any one or more of the devices described herein. The software architecture 1202 is supported by hardware such as a machine 1204 that includes processors 1206, memory 1208, and I/O components 1210. In this example, the software architecture 1202 can be conceptualized as a stack of layers, where each layer provides a particular functionality. The software architecture 1202 includes layers such as an operating system 1212, libraries 1214, frameworks 1216, and applications 1218. Operationally, the applications 1218 invoke API calls 1220 through the software stack and receive messages 1222 in response to the API calls 1220.

The operating system 1212 manages hardware resources and provides common services. The operating system 1212 includes, for example, a kernel 1224, services 1226, and drivers 1228. The kernel 1224 acts as an abstraction layer between the hardware and the other software layers. For example, the kernel 1224 provides memory management, processor management (e.g., scheduling), component management, networking, and security settings, among other functionalities. The services 1226 can provide other common services for the other software layers. The drivers 1228 are responsible for controlling or interfacing with the underlying hardware. For instance, the drivers 1228 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1214 provide a common low-level infrastructure used by the applications 1218. The libraries 1214 can include system libraries 1230 (e.g., C standard library) that provide functions such as memory allocation functions, string manipulation functions, mathematical functions, and the like. In addition, the libraries 1214 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1214 can also include a wide variety of other libraries 1234 to provide many other APIs to the applications 1218.

The frameworks 1216 provide a common high-level infrastructure that is used by the applications 1218. For example, the frameworks 1216 provide various graphical user interface (GUI) functions, high-level resource management, and high-level location services. The frameworks 1216 can provide a broad spectrum of other APIs that can be used by the applications 1218, some of which can be specific to a particular operating system or platform.

In an example, the applications 1218 can include a home application 1236, a contacts application 1238, a browser application 1240, a book reader application 1242, a location application 1244, a media application 1246, a messaging application 1248, a game application 1250, and a broad assortment of other applications such as a third-party application 1252. The applications 1218 are programs that execute functions defined in the programs. Various programming languages can be employed to create one or more of the applications 1218, structured in a variety of manners, such as object-oriented programming languages (e.g., Objective-C, Java, or C++) or procedural programming languages (e.g., C or assembly language). In a specific example, the third-party application 1252 (e.g., an application developed using the ANDROID™ or IOS™ software development kit (SDK) by an entity other than the vendor of a platform) can be mobile software running on a mobile operating system such as IOS™, ANDROID™, WINDOWS® Phone, or another mobile operating system. In this example, the third-party application 1252 can invoke the API calls 1220 provided by the operating system 1212 to facilitate functionalities described herein.

Figure 13:
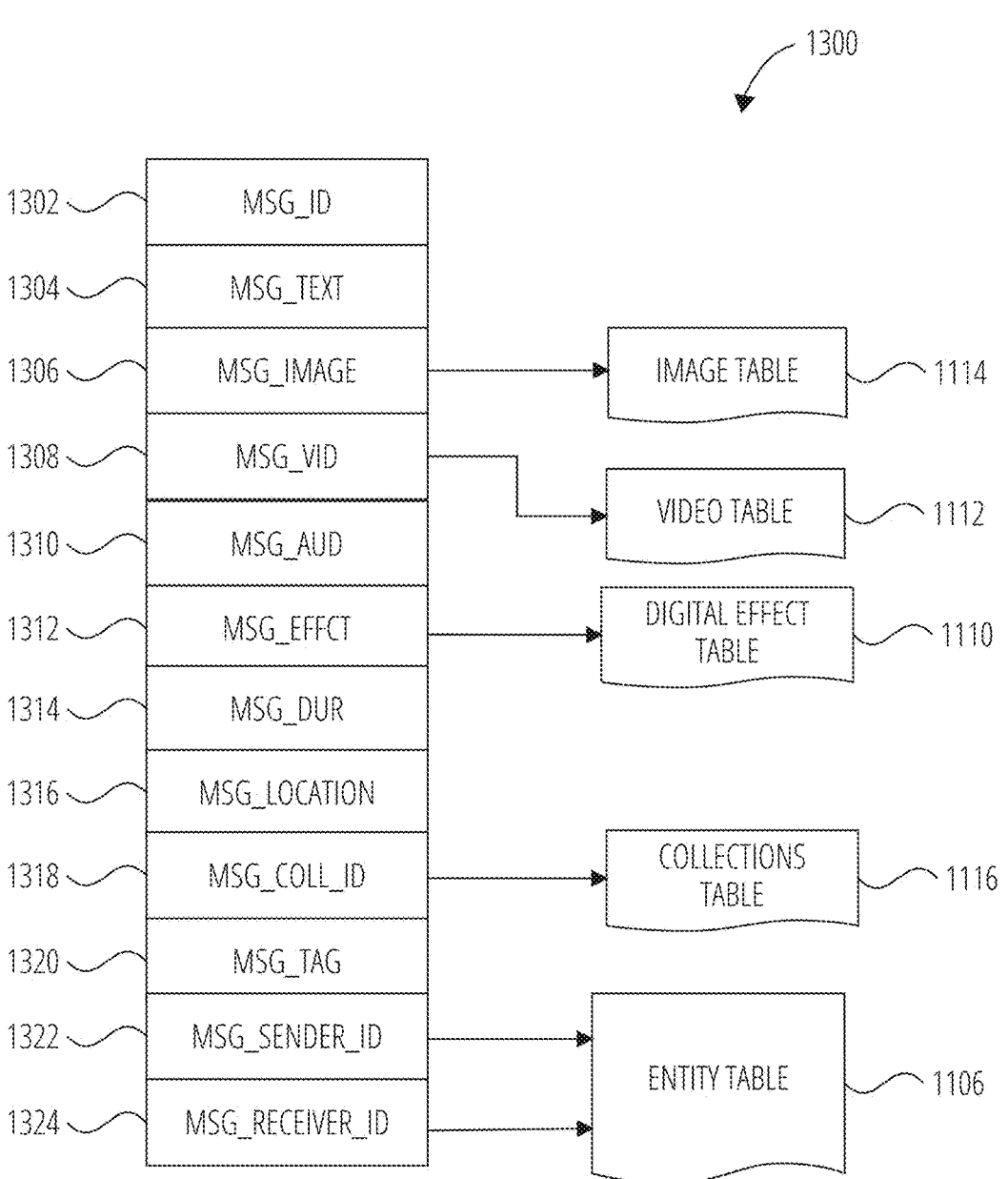
FIG. 13 is a diagrammatic representation of a message, according to some examples.

FIG. 13 is a schematic diagram illustrating a structure of a message 1300, according to some examples, generated by an interaction client 204 for communication to a further interaction client 204 via the servers 224. The content of a particular message 1300 is used to populate the message table 1104 stored within the database 228, accessible by the servers 224. Similarly, the content of a message 1300 is stored in memory as "in-transit" or "in-flight" data of the user system 202 or the servers 224. A message 1300 is shown to include the following example components:

Message identifier 1302: a unique identifier that identifies the message 1300.

Message text payload 1304: text, to be generated by a user via a user interface of the user system 202, and that is included in the message 1300.

Message image payload 1306: image data, captured by a camera component of a user system 202 or retrieved from a memory component of a user system 202, and that is included in the message 1300. Image data for a sent or received message 1300 can be stored in the image table 1114.

Message video payload 1308: video data, captured by a camera component or retrieved from a memory component of the user system 202, and that is included in the message 1300. Video data for a sent or received message 1300 can be stored in the video table 1112.

Message audio payload 1310: audio data, captured by a microphone or retrieved from a memory component of the user system 202, and that is included in the message 1300.

Message digital effect data 1312: digital effect data (e.g., filters, stickers, or other annotations or enhancements) that represents digital effects to be applied to message image payload 1306, message video payload 1308, or message audio payload 1310 of the message 1300. Digital effect data for a sent or received message 1300 can be stored in the digital effect table 1110.

Message duration parameter 1314: parameter value indicating, in seconds, the amount of time for which content of the message (e.g., the message image payload 1306, message video payload 1308, message audio payload 1310) is to be presented or made accessible to a user via the interaction client 204.

Message geolocation parameter 1316: geolocation data (e.g., latitudinal, and longitudinal coordinates) associated with the content payload of the message. Multiple message geolocation parameter 1316 values can be included in the payload, each of these parameter values being associated with respect to content items included in the content (e.g., a specific image within the message image payload 1306, or a specific video in the message video payload 1308).

Message collection identifier 1318: identifier values identifying one or more content collections (e.g., "stories" identified in the collections table 1116) with which a particular content item in the message image payload 1306 of the message 1300 is associated. For example, multiple images within the message image payload 1306 can each be associated with multiple content collections using identifier values.

Message tag 1320: each message 1300 can be tagged with multiple tags, each of which is indicative of the subject matter of content included in the message payload. For example, where a particular image included in the message image payload 1306 depicts an animal (e.g., a lion), a tag value can be included within the message tag 1320 that is indicative of the relevant animal. Tag values can be generated manually, based on user input, or can be automatically generated using, for example, image recognition.

Message sender identifier 1322: an identifier (e.g., a messaging system identifier, email address, or device identifier) indicative of a user of the user system 202 on which the message 1300 was generated and from which the message 1300 was sent.

Message receiver identifier 1324: an identifier (e.g., a messaging system identifier, email address, or device identifier) indicative of a user of the user system 202 to which the message 1300 is addressed.

The contents (e.g., values) of the various components of message 1300 can be pointers to locations in tables within which content data values are stored. For example, an image value in the message image payload 1306 can be a pointer to (or address of) a location within an image table 1114. Similarly, values within the message video payload 1308 can point to data stored within a video table 1112, values stored within the message digital effect data 1312 can point to data stored in a digital effect table 1110, values stored within the message collection identifier 1318 can point to data stored in a collections table 1116, and values stored within the message sender identifier 1322 and the message receiver identifier 1324 can point to user records stored within an entity table 1106.

Described implementations of the subject matter can include one or more features, alone or in combination as illustrated below by way of example:

Example 1 is a method, comprising: capturing, by one or more processors using one or more cameras of an extended Reality (XR) system, images including images of a first hand of a user and a second hand of the user; generating, by the one or more processors, cropped images using the images, each cropped image including an area of a surface of the first hand; detecting, by the one or more processors, a hand touch of the surface of the first hand by a digit of the second hand using the cropped images; and using, by the one or more processors, the hand touch as an input into an XR user interface of the XR system.

In Example 2, the subject matter of Example 1 includes, wherein the surface of the first hand is a palmar surface.

In Example 3, the subject matter of any of Examples 1-2 includes, wherein the surface of the hand is a hand dorsal surface.

In Example 4, the subject matter of any of Examples 1-3 includes, calibrating a hand touch detection sensitivity using a set of individual hand characteristics of the user.

In Example 5, the subject matter of any of Examples 1-4 includes, wherein detecting the hand touch includes interpolating between two or more detected hand touch pressure levels.

In Example 6, the subject matter of any of Examples 1-5 includes, wherein detecting the hand touch comprises using a machine learning model trained on a dataset including images of hand touches under two or more lighting conditions.

In Example 7, the subject matter of any of Examples 1-6 includes, wherein the XR system is a head-wearable apparatus.

Example 8 is at least one machine-readable medium including instructions that, when executed by processing circuitry, cause the processing circuitry to perform operations to implement any of Examples 1-7.

Example 9 is an apparatus comprising means to implement any of Examples 1-7.

Example 10 is a system to implement any of Examples 1-7.

Example 11 is a method to implement any of Examples 1-7.

The various features, operations, or processes described herein can be used independently of one another, or can be combined in various ways. All possible combinations and sub-combinations are intended to fall within the scope of this disclosure. In addition, certain method or process blocks can be omitted in some implementations.

Although some examples, e.g., those depicted in the drawings, include a particular sequence of operations, the sequence can be altered without departing from the scope of the present disclosure. For example, some of the operations depicted can be performed in parallel or in a different sequence that does not materially affect the functions as described in the examples. In other examples, different components of an example device or system that implements an example method can perform functions at substantially the same time or in a specific sequence.

Changes and modifications can be made to the disclosed examples without departing from the scope of the present disclosure. These and other changes or modifications are intended to be included within the scope of the present disclosure, as expressed in the appended claims.

Term Examples

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to."

As used herein, the terms "connected," "coupled," or any variant thereof means any connection or coupling, either direct or indirect, between two or more elements; the coupling or connection between the elements can be physical, logical, or a combination thereof.

Additionally, the words "herein," "above," "below," and words of similar import, when used in this application, refer to this application as a whole and not to any portions of this application. Where the context permits, words using the singular or plural number can also include the plural or singular number respectively.

The word "or" in reference to a list of two or more items, covers all the following interpretations of the word: any one of the items in the list, all the items in the list, and any combination of the items in the list. Likewise, the term "and/or" in reference to a list of two or more items, covers all the following interpretations of the word: any one of the items in the list, all the items in the list, and any combination of the items in the list.

"Carrier signal" can include, for example, any intangible medium that can store, encoding, or carrying instructions for execution by the machine and includes digital or analog communications signals or other intangible media to facilitate communication of such instructions. Instructions can be transmitted or received over a network using a transmission medium via a network interface device.

"Client device" can include, for example, any machine that interfaces to a network to obtain resources from one or more server systems or other client devices. A client device can be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user can use to access a network.

"Component" can include, for example, a device, physical entity, or logic having boundaries defined by function or subroutine calls, branch points, APIs, or other technologies that provide for the partitioning or modularization of particular processing or control functions. Components can be combined via their interfaces with other components to carry out a machine process. A component can be a packaged functional hardware unit designed for use with other components and a part of a program that usually performs a particular function of related functions. Components can constitute either software components (e.g., code embodied on a machine-readable medium) or hardware components. A "hardware component" is a tangible unit capable of performing certain operations and can be configured or arranged in a certain physical manner. In various examples, one or more computer systems (e.g., a standalone computer system, a client computer system, or a server computer system) or one or more hardware components of a computer system (e.g., a processor or a group of processors) can be configured by software (e.g., an application or application portion) as a hardware component that operates to perform certain operations as described herein. A hardware component can also be implemented mechanically, electronically, or any suitable combination thereof. For example, a hardware component can include dedicated circuitry or logic that is permanently configured to perform certain operations. A hardware component can be a special-purpose processor, such as a field-programmable gate array (FPGA) or an application-specific integrated circuit (ASIC). A hardware component can also include programmable logic or circuitry that is temporarily configured by software to perform certain operations. For example, a hardware component can include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), can be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor can be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In examples in which multiple hardware components are configured or instantiated at different times, communications between such hardware components can be achieved, for example, through the storage and retrieval of information in memory structures to which the multiple hardware components have access. For example, one hardware component can perform an operation and store the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information). The various operations of example methods described herein can be performed, at least partially, by one or more processors that are temporarily configured (e.g., by software) or permanently configured to perform the relevant operations. Whether temporarily or permanently configured, such processors can constitute processor-implemented components that operate to perform one or more operations or functions described herein. As used herein, "processor-implemented component" can refer to a hardware component implemented using one or more processors. Similarly, the methods described herein can be at least partially processor-implemented, with a particular processor or processors being an example of hardware. For example, at least some of the operations of a method can be performed by one or more processors or processor-implemented components. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API). The performance of certain of the operations can be distributed among the processors, not only residing within a single machine, but deployed across a number of machines. In some examples, the processors or processor-implemented components can be located in a single geographic location (e.g., within a home environment, an office environment, or a server farm). In other examples, the processors or processor-implemented components can be distributed across a number of geographic locations.

"Computer-readable medium" can include, for example, both machine-storage media and signal media. Thus, the terms include both storage devices/media and carrier waves/modulated data signals. The terms "machine-readable medium," "computer-readable medium" and "device-readable medium" mean the same thing and can be used interchangeably in this disclosure.

"Machine-storage medium" can include, for example, a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media, and device-storage media include non-volatile memory, including by way of example semiconductor memory devices, e.g., erasable programmable read-only memory (EPROM), electrically erasable programmable read-only memory (EEPROM), Field-Programmable Gate Arrays (FPGA), flash memory devices, Solid State Drives (SSD), and Non-Volatile Memory Express (NVMe) devices; magnetic disks such as internal hard disks and removable disks; magneto-optical disks; and CD-ROM, DVD-ROM, Blu-ray Discs, and Ultra HD Blu-ray discs. In addition, machine-storage medium can also refer to cloud storage services, Network Attached Storage (NAS), Storage Area Networks (SAN), and object storage devices. The terms "machine-storage medium," "device-storage medium," "computer-storage medium" mean the same thing and can be used interchangeably in this disclosure. The terms "machine-storage media," "computer-storage media," and "device-storage media" specifically exclude carrier waves, modulated data signals, and other such media, at least some of which are covered under the term "signal medium."

"Network" can include, for example, one or more portions of a network that can be an ad hoc network, an intranet, an extranet, a Virtual Private Network (VPN), a Local Area Network (LAN), a Wireless LAN (WLAN), a Wide Area Network (WAN), a Wireless WAN (WWAN), a Metropolitan Area Network (MAN), the Internet, a portion of the Internet, a portion of the Public Switched Telephone Network (PSTN), a Voice over IP (VOIP) network, a cellular telephone network, a 5G™ network, a wireless network, a Wi-Fi® network, a Wi-Fi 6® network, a Li-Fi network, a Zigbee® network, a Bluetooth® network, another type of network, or a combination of two or more such networks. For example, a network or a portion of a network can include a wireless or cellular network, and the coupling can be a Code Division Multiple Access (CDMA) connection, a Global System for Mobile communications (GSM) connection, or other types of cellular or wireless coupling. In this example, the coupling can implement any of a variety of types of data transfer technology, such as third Generation Partnership Project (3GPP) including 4G, fifth-generation wireless (5G) networks, Universal Mobile Telecommunications System (UMTS), High Speed Packet Access (HSPA), Long Term Evolution (LTE) standard, others defined by various standard-setting organizations, other long-range protocols, or other data transfer technology.

"Non-transitory computer-readable medium" can include, for example, a tangible medium that is capable of storing, encoding, or carrying the instructions for execution by a machine.

"Processor" can include, for example, data processors such as a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), a Quantum Processing Unit (QPU), a Tensor Processing Unit (TPU), a Neural Processing Unit (NPU), a Field Programmable Gate Array (FPGA), another processor, or any suitable combination thereof. The term "processor" can include multi-core processors that can comprise two or more independent processors (sometimes referred to as "cores") that can execute instructions contemporaneously. These cores can be homogeneous (e.g., all cores are identical, as in multicore CPUs) or heterogeneous (e.g., cores are not identical, as in many modern GPUs and some CPUs). In addition, the term "processor" can also encompass systems with a distributed architecture, where multiple processors are interconnected to perform tasks in a coordinated manner. This includes cluster computing, grid computing, and cloud computing infrastructures. Furthermore, the processor can be embedded in a device to control specific functions of that device, such as in an embedded system, or it can be part of a larger system, such as a server in a data center. The processor can also be virtualized in a software-defined infrastructure, where the processor's functions are emulated in software.

"Signal medium" can include, for example, an intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and can be used interchangeably in this disclosure.

"User device" can include, for example, a device accessed, controlled or owned by a user and with which the user interacts perform an action, engagement or interaction on the user device, including an interaction with other users or computer systems.

What is claimed is:

1. A method, comprising:
capturing, by one or more processors using one or more cameras of an eXtended Reality (XR) system, images including one or more images of a first hand of a user and a second hand of the user;
generating, by the one or more processors, cropped images using the one or more images, each cropped image including an area of a surface of the first hand;
detecting, by the one or more processors, a hand touch of the surface of the first hand by a digit of the second hand using the cropped images by interpolating between two or more detected hand touch pressure levels; and
using, by the one or more processors, the hand touch as an input into an XR user interface of the XR system.

2. The method of claim 1, wherein the surface of the first hand is a palmar surface.

3. The method of claim 1, wherein the surface of the hand is a hand dorsal surface.

4. The method of claim 1, further comprising calibrating a hand touch detection sensitivity using a set of individual hand characteristics of the user.

5. The method of claim 1, wherein detecting the hand touch comprises using a machine learning model trained on a dataset including images of hand touches under two or more lighting conditions.

6. The method of claim 1, wherein the XR system is a head-wearable apparatus.

7. The method of claim 1, wherein the XR user interface includes one or more interactive virtual objects displayed in association with a specified portion of the surface of the first hand.

8. A machine comprising:

at least one processor; and at least one memory storing instructions that, when executed by the at least one processor, cause the machine to perform operations comprising:

capturing, by one or more processors using one or more cameras of an eXtended Reality (XR) system, images including one or more images of a first hand of a user and a second hand of the user;

generating, by the one or more processors, cropped images using the one or more images, each cropped image including an area of a surface of the first hand;

detecting, by the one or more processors, a hand touch of the surface of the first hand by a digit of the second hand using the cropped images by interpolating between two or more detected hand touch pressure levels; and using, by the one or more processors, the hand touch as an input into an XR user interface of the XR system.

9. The machine of claim 8, wherein the surface of the first hand is a palmar surface.

10. The machine of claim 8, wherein the surface of the hand is a hand dorsal surface.

11. The machine of claim 8, wherein the operations further comprise calibrating a hand touch detection sensitivity using a set of individual hand characteristics of the user.

12. The machine of claim 8, wherein detecting the hand touch comprises using a machine learning model trained on a dataset including images of hand touches under two or more lighting conditions.

13. The machine of claim 8, wherein the XR system is a head-wearable apparatus.

14. The machine of claim 8, wherein the XR user interface includes one or more interactive virtual objects displayed in association with a specified portion of the surface of the first hand.

15. A machine-storage medium, the machine-storage medium including instructions that, when executed by a machine, cause the machine to perform operations comprising:

capturing, by one or more processors using one or more cameras of an eXtended Reality (XR) system, images including one or more images of a first hand of a user and a second hand of the user;

generating, by the one or more processors, cropped images using the one or more images, each cropped image including an area of a surface of the first hand;

detecting, by the one or more processors, a hand touch of the surface of the first hand by a digit of the second hand using the cropped images by interpolating between two or more detected hand touch pressure levels; and using, by the one or more processors, the hand touch as an input into an XR user interface of the XR system.

16. The machine-storage medium of claim 15, wherein the surface of the first hand is a palmar surface.

17. The machine-storage medium of claim 15, wherein the surface of the hand is a hand dorsal surface.

18. The machine-storage medium of claim 15, wherein the operations further comprise calibrating a hand touch detection sensitivity using a set of individual hand characteristics of the user.

19. The machine-storage medium of claim 15, wherein the XR system is a head-wearable apparatus.

20. The machine-storage medium of claim 15, wherein the XR user interface includes one or more interactive virtual objects displayed in association with a specified portion of the surface of the first hand.

* * * * *